(12) United States Patent
Duncan et al.

(10) Patent No.: US 12,069,345 B2
(45) Date of Patent: Aug. 20, 2024

(54) CHARACTERIZING CONTENT FOR AUDIO-VIDEO DUBBING AND OTHER TRANSFORMATIONS

(71) Applicant: WARNER BROS. ENTERTAINMENT INC., Burbank, CA (US)

(72) Inventors: Grant L. Duncan, Burbank, CA (US); Elizabeth McKenzie, Sherman Oaks, CA (US); Iris Grethmann, London (GB); Jonathan Whiles, London (GB)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 523 days.

(21) Appl. No.: 17/233,443

(22) Filed: Apr. 17, 2021

(65) Prior Publication Data

US 2021/0352380 A1  Nov. 11, 2021

Related U.S. Application Data

(63) Continuation of application No. PCT/US2019/056828, filed on Oct. 17, 2019.
(Continued)

(51) Int. Cl.
*H04N 21/81* (2011.01)
*H04N 21/439* (2011.01)
(Continued)

(52) U.S. Cl.
CPC ..... *H04N 21/8106* (2013.01); *H04N 21/4394* (2013.01); *H04N 21/44008* (2013.01); *H04N 21/4884* (2013.01); *H04N 21/8456* (2013.01)

(58) Field of Classification Search
CPC ........ G06F 16/683; G06F 16/68; G06F 16/60; G06F 3/0482
(Continued)

(56) References Cited

U.S. PATENT DOCUMENTS 6,782,394 B1 *   8/2004  Landeck ............... G06F 16/284
2006/0088283 A1 * 4/2006  Takagi ............... G11B 27/3027
                                                    386/231
(Continued)

FOREIGN PATENT DOCUMENTS

KR      10-0636386 B1    10/2006
KR   10-2017-0066962 A    6/2017
(Continued)

OTHER PUBLICATIONS

WO, PCT/US2019/056828 ISR and Written Opinion, Feb. 27, 2020.

*Primary Examiner* — Alexander Krzystan
(74) *Attorney, Agent, or Firm* — Bookoff McAndrews, PLLC

(57) ABSTRACT

A computer-implemented method for transforming audio-video data includes automatically detecting substantially all discrete human-perceivable messages encoded in the audio-video data, determining a semantic encoding for each of the detected messages, assigning a time code to each of the encodings correlated to specific frames of the audio-video data, and recording a data structure relating each time code to a corresponding one of the semantic encodings in a recording medium. The method may further include converting extracted recorded vocal instances from the audio-video data into a text data, generating a dubbing list comprising the text data and the time code, assigning a set of annotations corresponding to the one or more vocal instances specifying one or more creative intents, generating the scripting data comprising the dubbing list and the set of annotations, and other optional operations. An apparatus
(Continued)

may be programmed to perform the method by executable instructions for the foregoing operations.

20 Claims, 11 Drawing Sheets

Related U.S. Application Data

(60) Provisional application No. 62/747,634, filed on Oct. 18, 2018.

(51) Int. Cl.
*H04N 21/44* (2011.01)
*H04N 21/488* (2011.01)
*H04N 21/845* (2011.01)

(58) Field of Classification Search
USPC .......................................................... 700/94
See application file for complete search history.

(56) References Cited

U.S. PATENT DOCUMENTS

2006/0285654 A1* 12/2006 Nesvadba ...... H04N 21/440236
348/E5.122
2011/0288862 A1 11/2011 Todic
2011/0311197 A1* 12/2011 Kataoka ............... H04N 9/8205
386/E9.011
2012/0124368 A1* 5/2012 Driessen .................. G09C 5/00
713/153
2012/0272152 A1* 10/2012 Chevallier ......... H04N 21/2541
715/719
2013/0151251 A1* 6/2013 Herz ...................... G10L 21/00
704/235
2013/0294443 A1* 11/2013 Kahn .................... H04M 7/128
370/352
2015/0121178 A1* 4/2015 Karmarkar ........... G11B 27/105
715/201
2015/0149183 A1 5/2015 Hennequin
2016/0021334 A1* 1/2016 Rossano ................ G10L 13/033
704/2
2016/0196252 A1 7/2016 Wu et al.
2020/0275114 A1* 8/2020 Radford ............. H04N 21/8456

FOREIGN PATENT DOCUMENTS

WO  WO 2018/022808 A1  2/2018
WO  WO 2019/068025 A1  4/2019

\* cited by examiner

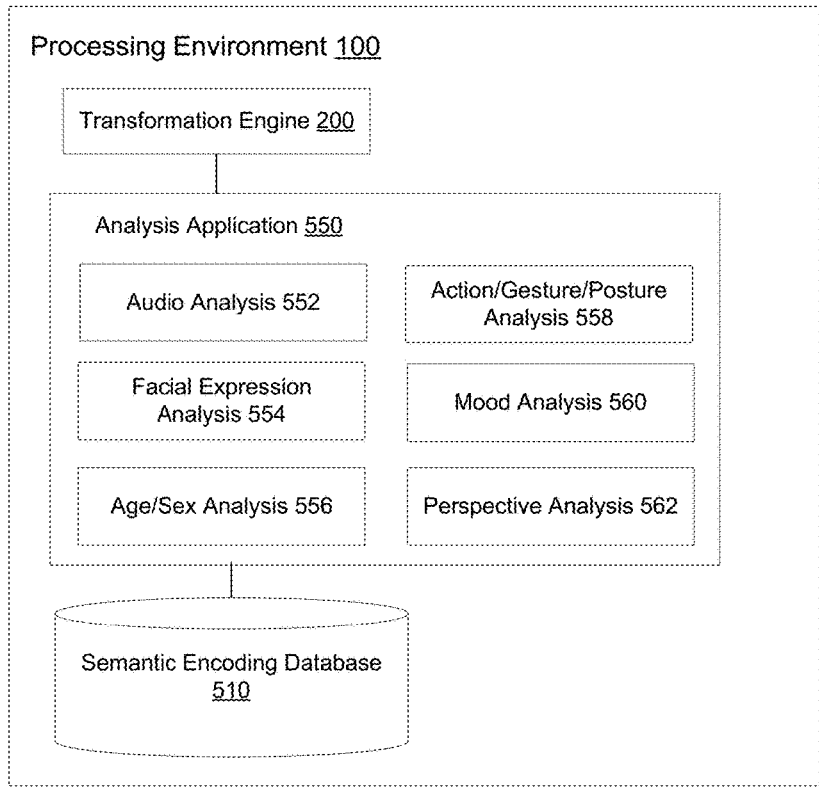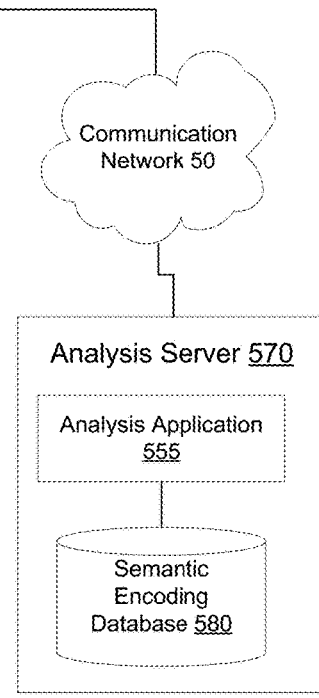
FIG. 5
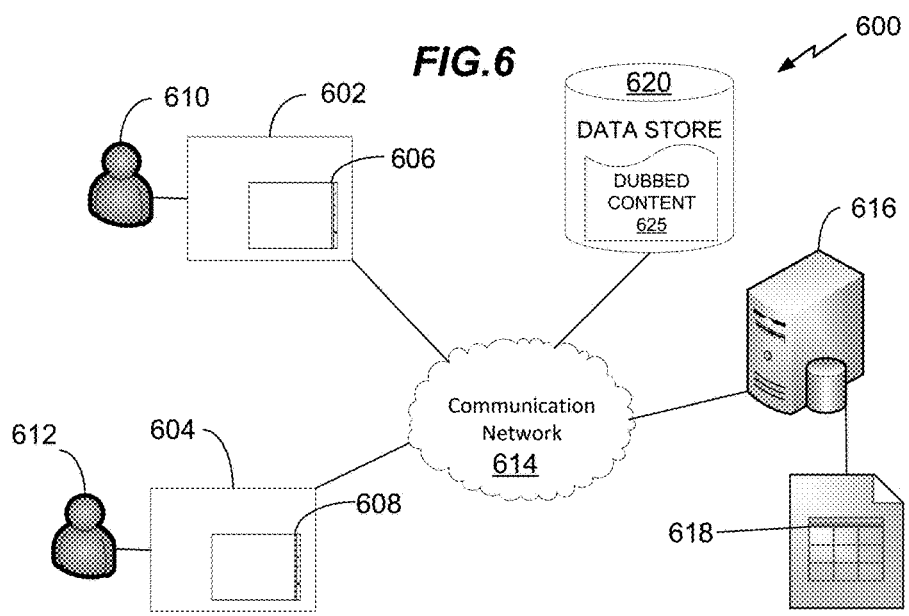
FIG. 6

810 — RECEIVING, BY ONE OR MORE PROCESSORS, THE MEDIA DATA COMPRISING ONE OR MORE RECORDED VOCAL INSTANCES

820 — EXTRACTING, BY THE ONE OR MORE PROCESSORS, THE ONE OR MORE RECORDED VOCAL INSTANCES FROM AN AUDIO PORTION OF THE MEDIA DATA

830 — ASSIGNING, BY THE ONE OR MORE PROCESSORS, A TIME CODE TO EACH OF THE EXTRACTED VOCAL INSTANCES, CORRELATED TO A SPECIFIC FRAME OF THE MEDIA DATA

840 — CONVERTING, BY THE ONE OR MORE PROCESSORS, THE EXTRACTED RECORDED VOCAL INSTANCES INTO A TEXT DATA

850 — GENERATING, BY THE ONE OR MORE PROCESSORS, A DUBBING LIST COMPRISING THE TEXT DATA AND THE TIME CODE

860 — DISPLAYING, BY THE ONE OR MORE PROCESSORS, A SELECTED PORTION OF THE DUBBING LIST CORRESPONDING TO THE ONE OR MORE VOCAL INSTANCES

870 — ASSIGNING, BY THE ONE OR MORE PROCESSORS, A SET OF ANNOTATIONS CORRESPONDING TO THE ONE OR MORE VOCAL INSTANCES, THE SET OF ANNOTATIONS SPECIFYING ONE OR MORE CREATIVE INTENTS OF THE ONE OR MORE VOCAL INSTANCES

880 — GENERATING, BY THE ONE OR MORE PROCESSORS, THE SCRIPTING DATA COMPRISING THE DUBBING LIST AND THE SET OF ANNOTATIONS

CHARACTERIZING CONTENT FOR AUDIO-VIDEO DUBBING AND OTHER TRANSFORMATIONS

CROSS-REFERENCE TO RELATED APPLICATIONS

The present application is a continuation of international (PCT) application PCT/US2019/056828 filed Oct. 17, 2019, which claims priority under 35 U.S.C. § 119(e) to U.S. provisional application Ser. No. 62/747,634 filed Oct. 18, 2018, which applications are incorporated herein by reference in their entireties.

FIELD

The present disclosure relates to a system and method for content characterization for transforming audio-video data, for example transforming substantially all discrete human-perceivable messages encoded in audio-video data for use in dubbing and other transformations.

BACKGROUND

Television programming may be originally produced in one country, but oftentimes the same programming is also re-distributed in multiple countries. Most of the programming is typically dubbed into the local languages upon the re-distribution. With the advent of internet-based multimedia streaming platforms for example NETFLIX®, where it is desirable to rapidly redistribute the episodes for a given television programming in multiple countries and oftentimes in multiple different languages, there is little time for producers of the television programming to supervise the dubbing process. Moreover, the dubbing must be accurate as well. As used herein, a "dubbing process" is a process of dubbing performed with aid of a processing machine, while "dubbing" as used herein means translating spoken dialog or text in recorded or live audio-video content from an original language to a different language, including activities used to enhance the quality of the dubbing prior to actual translation and voice acting. Quality of dubbing is based on the degree to which the translated language correctly conveys the meaning and artistic sense of the original dialog or text in the context of the original video recording. Perfect quality in dubbing may not be possible but may be understood as that quality enabling foreign-language audiences to experience and understand the dubbed content in the translated languages to a degree that resembles the experience of audiences experiencing the original content as closely as cultural differences between the two groups can allow.

Currently, dubbing depends on the human efforts of the transcribers who create a detailed transcription of the television programming, the translators who translate the transcription into the local languages, and foreign voice actors who provide dubbing of the translated dialogues in respective local languages. For instance, the transcribers must analyze each scene of the television programming and provide a detailed description of what is happening in each scene, including accurately and completely transcribing the dialogues of the characters in each scene and identifying any background noises in each scene that are relevant to the creative intents of the scenes. The translators then need to accurately and completely provide translations of the transcribed dialogues into respective local languages, which must correctly reflect the creative intents associated with the dialogues, and voice actors need to provide performances that convey the director's intended tone and emotional impact. Providing artistically accurate translations is oftentimes much more difficult to do than simply providing literal translations, because literal translations oftentimes fail to fully or accurately capture the creative intents of the dialogues that may be expressed in the dialogues of a given language, as may be expressed by dialects, accents, idioms, irony, play on words, slangs, metaphors, and anything that may not have literal translation in another language. In the end, high quality dubbing processes heavily on laborious human efforts, making the dubbing process too time-consuming and inefficient for serving many global audiences.

It is desirable, therefore, to provide new systems and methods for dubbing and related content characterization processes which involve translating or correctly conveying the sense of audio-video data that overcome these and other disadvantages in the existing art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method of creating scripting data for dubbing audio of media data generates a dataset useful for dubbing (e.g., a dubbing list or dubbing sheet) in a subsequent process while freeing any human agent from watching and listening to the media content being dubbed. The subsequent dubbing process may be manual, semi-automated, or fully automated. The method may include receiving, by one or more processors, the media data comprising one or more recorded vocal instances. Vocal instances can include narrative instances, dialogue, vocals, titles, etc.

The method may further include: extracting, by the one or more processors, the one or more recorded vocal instances from an audio portion of the media data. For instance, the extraction may include automatic speech extraction by a machine, such as computer software application executed on a computer hardware. The method may further include assigning, by the one or more processors, a time code to each of the extracted vocal instances, correlated to a specific frame of the media data; converting, by the one or more processors, the extracted recorded vocal instances into a text data; generating, by the one or more processors, a dubbing list comprising the text data and the time code; and displaying, by the one or more processors, a selected portion of the dubbing list corresponding to the one or more vocal instances.

The dubbing list as used herein may include a dialogue list, spotting list, or any text or other symbolic data useful for dubbing audio message encoded in media data.

The method may further include assigning, by the one or more processors, a set of annotations corresponding to the one or more vocal instances, the set of annotations specifying one or more creative intents of the one or more vocal instances; and/or generating, by the one or more processors, the scripting data comprising the dubbing list and the set of annotations.

In certain embodiments or aspects, the method further includes: detecting, by the one or more processors, substantially all discrete human-perceivable messages encoded in the media data. The method may further include determining, by the one or more processors, a semantic encoding for each of the detected messages.

In other embodiments or aspects, the method includes generating, by the one or more processors, the set of annotations based on one or more of the determined semantic encodings.

In certain embodiments or aspects, the time code may include a time-in and a time-out.

In certain embodiments or aspects, the dubbing list may further include an identity information of each of the extracted vocal instances. The identity information may include, for example, the identity of the speaker (e.g., a character in a movie) uttering the dialogue or the actual or intended recipient of the dialogue uttered by the speaker.

In other embodiments or aspects, the dubbing list may be selected from a group consisting of a dialogue list, a spotting list, or both.

In certain embodiments or aspects, the set of annotations may provide an explanation of context specific to a language used in the one or more extracted vocal instances. Such explanation of context may include, for instance, slang, play on words, metaphors, etc.

In other embodiments or aspects, the set of annotations may provide a description of a scene in which the one or more extracted vocal instances occur.

In certain embodiments or aspects, the set of annotations may include annotations for a rotoscoped content.

In certain embodiments or aspects, the method further includes translating, by the one or more processors, the text data in a first language to a second language.

In other embodiments or aspects, the method further includes grouping, by the one or more processors, the one or more extracted recorded voice instances based on at least one of: a closed caption, a subtitle, a script, a transcript, a scene position, a main title, an insert, a location card, a background title, a song type, a lyric of a song, a character that sings the song, an intellectual property ownership, a censorship flag, and a delivery format. For instance, the song type may refer to whether the song is licensed or not, whether the song is specifically written for the film encoded in the media data, and the like. Content flagged for censorship may include offensive, inappropriate, or politically incorrect content, such as god references, smoking, animal cruelty, violence, modesty, sexual content, offensive language, jeopardy, scary content, or the like. Delivery format may include any suitable options for sharing the dubbing list electronically, i.e., document, platform, etc., with the creative community associated with a project undertaken by using the method described herein.

In other embodiments or aspects, the method further includes identifying, by the one or more processors, the one or more extracted record voice instances as corresponding to a role played by a child. For example, a machine process (software/hardware) that detects and identifies the voice pattern of the recorded voice instances as belonging to a child or not, as further described herein below, may be used.

In another aspect of the disclosure, a computer-implemented method for transforming audio-video data includes detecting, by one or more processors, substantially all discrete human-perceivable messages encoded in the audio-video data, for use in dubbing or in any other application for which conveying an accurate sense of the human-perceivable messages is useful. Other applications may include, for example, operating social robots, creating memes, automatic content selection, cross-cultural analysis of video content, and video games that incorporate video clips in game play.

As used herein the term, "discrete" may be synonymous or same as "independent" or "defined by discontinuities," examples being an utterance or semantically significant sound by a character or other source.

The method may further include determining, by the one or more processors, a semantic encoding for each of the detected messages; assigning, by the one or more processors, a time code to each of the semantic encodings, correlated to specific frames of the audio-video data; and/or recording a data structure relating each time code to a corresponding one of the semantic encodings in a computer-readable medium. As used herein, "messages" may be defined, as in the realm of information science, to include both speech and text, including other symbols such as graphical information (e.g., figures, graphs, diagrams, shapes). For example, the messages may include inaudible video messages, e.g., signs. The semantic encoding may include intents (e.g., creative intents) associated with or expressed by the "messages," as used herein.

In certain embodiments or aspects, the method further includes receiving, by the one or more processors, at least one of a dialogue list, a spotting list, or a production script for the audio-video data via a user interface with one or more parameters for determining the semantic encodings for the detected messages.

In other embodiments or aspects, the method further includes relating, by the one or more processors, one or more of the determined semantic encodings to a source character or a source object, based on a machine-encoded representation of at least one of a dialog list, a spotting list, or production script for the audio-video data.

In other embodiments or aspects, the method further includes relating, by the one or more processors, one or more determined semantic encodings to a receiving character or a receiving object, based on a machine-encoded representation of at least one of a dialog list, a spotting list, or production script for the audio-video data.

In certain other embodiments or aspects, the method further includes recording, by the one or more processors, an indicator for each of the source character or a source object and for the receiving character or the receiving object in the data structure.

In certain embodiments or aspects, the method further includes transcoding, by the one or more processors, the semantic encodings and data structure to a human-readable form. A human-readable form may include, for example, a dubbing sheet.

In other embodiments or aspects, the method further includes translating, by the one or more processors, the semantic encodings from a first human language to a second human language.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

DESCRIPTION OF DRAWINGS

The features, nature, and advantages of the present disclosure will become more apparent from the detailed description set forth below when taken in conjunction with the drawings in which like reference characters identify like elements correspondingly throughout the specification and drawings.

FIG. 5 is a block diagram illustrating aspects of functional components making up a processing environment and an application(s) for performing methods for a content characterization process which involves transforming audio-video data as described herein.

FIG. 6 is a block diagram illustrating aspects of a system including different users performing the method for transforming audio-video data as disclosed herein, operating on separate computing machines that are in communication via a network to a database server.

FIGS. 8-9 show aspects of a method for a content characterization process which involves transforming audio-video data, as may be performed by the processing environment or other computing apparatus described herein.

DETAILED DESCRIPTION

Figure 1:
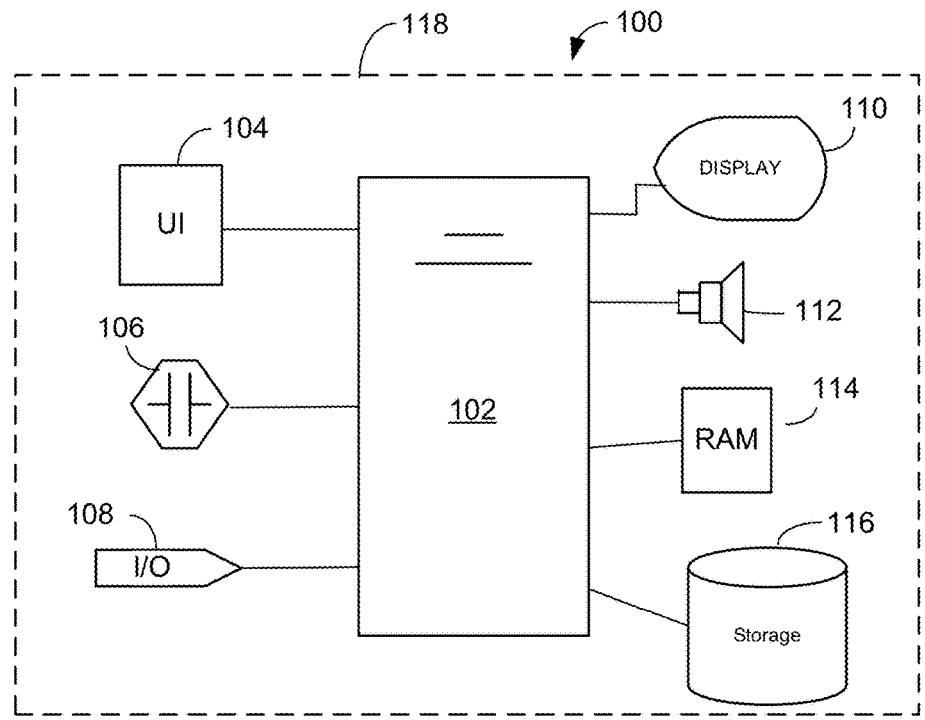
FIG. 1 is a schematic block diagram illustrating aspects of an apparatus for performing methods for a content characterization process which involves transforming audio-video data as described herein.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

The systems and methods of the present disclosure may be useful in various applications, including, but not limited to, the dubbing or voice-over of speech or dialogues from live events (e.g., political speeches and lectures), audio-video content, streamed multimedia, televised events, motion pictures, live education events, legal proceedings, text for hearing impaired individuals, or any other application where a speech-to-text or audio-to-text conversion with accurate content characterization may be desired. The systems and methods may also be useful in characterizing content for use in personalized robots, meme creation, content-based games, and consumer intelligence-based content selection, and the like.

Certain preferred embodiments of the present disclosure are described in detail below. These illustrative examples are not intended to limit the scope of the present disclosure.

As used in the instant disclosure, the terms "multimedia data," "media data," and "audio-video data" are used interchangeably to refer to information (e.g., digitized and analog information) that encodes or represents audio, video and/or audio-video content. Media data may include information not corresponding to audio or video. For example, media data may contain metadata representing information relevant or useful for the media data, such as scene, location, frame, timecode, cast list, character notes, synopsis, glossary, change list, version control, a list of actor(s) on a screen, duration of actors, objects or scenes on screen, product on screen, closed caption, subtitle, script, transcript, lyric of a song, name of singer or musical group, song title, camerawork, and similar metadata. Media data may be transmitted from one location or device to another location or device by methods including, but not limited to, via computer readable media which can include but are not limited to magnetic storage devices (e.g., hard disk, magnetic tape, or magnetic strips), optical disks (e.g., compact disk (CD), digital versatile disk (DVD), and the like), smart cards, and flash memory devices (e.g., card, stick). Additionally, it should be appreciated that a carrier wave can be employed to carry media data such as those used in transmitting and receiving electronic mail or in accessing a network such as the internet, a wide area network (WAN), and a local area network (LAN). Media data may also reside in signals (such as audio, video, and/or text) captured or extracted by one or more sensors.

As used herein, the term "audio data" refers to information (e.g., digitized and analog information) that encodes or represents audio in a machine-readable format, e.g., electronic binary data. For example, audio data may comprise encoded spoken language with or without additional audio. Audio data includes, but is not limited to, audio captured by a microphone and synthesized audio (e.g., computer generated digital audio).

As used in the instant disclosure, the term "video data" refers to information (e.g., digitized and analog information) encoding or representing video in a machine-readable form, for example, electronic binary data. Video data includes, but is not limited to, video captured by a video camera, images captured by a camera, and synthetized video (e.g., computer generated digital video).

As used in the instant disclosure, the term "text data" refers to information (e.g., analog or digital information) encoding or representing written language or other material capable of being represented in text format (e.g., corresponding to spoken audio) in a machine-readable form, e.g., ASCII binary code. For example, computer code (e.g., in Microsoft® .doc, .ppt, xml, or any other suitable format) encoding a textual transcript of a spoken audio, such as a script or transcript of a film containing all or most of the words of a speech, comprises text data. In addition to written language, text data may also encode graphical information (e.g., figures, graphs, diagrams, shapes) related to, or representing, spoken audio.

Referring to FIG. 1, aspects of a computing apparatus or processing environment 100 for implementing a method for transforming audio-video data as described herein are illustrated. The apparatus 100 may be used, for example, for characterizing content for use in audio dubbing, personalized robots, meme creation, content-based games, consumer intelligence-based content selection, videogaming, entertainment, social networking, user interfacing or other applications, and may include one or more processors (collectively, processor) 102, such as a central processing unit based on 80×86 architecture as designed by Intel™ or AMD™, or a system-on-a-chip as designed by ARM™. The processor 102 may be communicatively coupled to auxiliary devices or modules of the computing apparatus 100, using a bus or other coupling. Optionally, the processor 102 and some or all of its coupled auxiliary devices or modules (examples of which are depicted at 104-116) may be housed within or coupled to a housing 118, for example, a housing having a form factor of a wearable mixed reality gear, personal computer, gaming console, smart phone, notepad computer, laptop computer, set-top box, or other form factor. Alternatively, some or all of its coupled auxiliary devices or modules described above may be externally coupled to the housing 118 (e.g., the display 110), or remotely communicably coupled to the processor 102 (e.g., database 116) via wired or wireless interface (e.g., WiFi, Bluetooth®, infrared, etc.) or over a communication network (e.g., the internet), and the auxiliary devices or modules may be located in the cloud. Processing environment 100 may take various environments. In some embodiments, the functionality of the processing environment 100 may be integrated in software and hardware components of auxiliary devices or modules 104-116.

A user interface device 104 may be coupled to the processor 102 that may perform content characterization process which involves transforming audio-video data, such as a dubbing process of a dubbing engine executing on the processor 102, in response to user control input. As used herein, a "dubbing engine" refers to an executable module or set of modules capable of performing a dubbing process or substantial portion thereof, during execution by a processor or at other times. User control input may include, for example, selections from a graphical user interface or other input (e.g., textual or directional commands) generated via a touch screen, keyboard, pointing device (e.g., a mouse, a trackpad, a trackball, or the like), microphone, motion sensor, camera, or some combination of these or other input devices. User control input may also be provided via a sensor 106 coupled to the processor 102. A sensor may comprise, for example, a motion sensor (e.g., an accelerometer), a position sensor, a location sensor (for example, a Global Positioning System (GPS) receiver and controller), or a microphone.

The computing apparatus 100 may include an input/output port 108 coupled to the processor 102, to enable communication between the processing environment 100 and a computer network (such as communication network 50 in FIG. 5 and communication network 614 in FIG. 6). Such communication may be used, for example, to provide input to a node performing the processes described herein, or to provide output from such processes to an end user node, storage node, distribution node, or other destination. The methods described herein may be adapted for use with multiple users or with a single user, using input from a computer or electronic network 50, such as a worldwide web on the internet, a local area network, a wide area network, a peer-to-peer network, a social network, using such communication protocols as the electronic mail, voice and/or video chat, Voice-Over-IP (VoIP), text messaging, or the like.

A display 110 may be coupled to the processor 102, for example via a graphics processing unit (not shown) integrated in the processor 102 or in a separate chip. The display 110 may include, for example, a flat screen color liquid crystal (LCD) display illuminated by light-emitting diodes (LEDs) or other lamps, a projector driven by an LCD display or by a digital light processing (DLP) unit, or other digital display device. The display device 110 may be incorporated into an augmented reality (AR) headset, a smartphone with AR capability, or other immersive display system. Video output driven by a dubbing engine operating on the processor 102, or other application for coordinating user inputs with events simulated in a 3D environment, may be provided to the display device 110 and output as a video display to the user. Similarly, an amplifier/speaker or other audio output transducer 112 may be coupled to the processor 102 via an audio processing system. Audio output correlated to the video output and generated by the dubbing engine or other application may be provided to the audio transducer 112 and output as audible sound to the user.

The computing apparatus 100 may further include a random-access memory (RAM) 114 holding program instructions and data for rapid execution or processing by the processor during transforming audio-video data as described herein. When the device 100 is powered off or in an inactive state, program instructions and data may be stored in a long-term memory, for example, a non-volatile magnetic, optical, or electronic memory storage device 116. Either or both of the RAM 114 or the storage device 116 may comprise a non-transitory computer-readable medium holding program instructions, that when executed by the processor 102, cause the device 100 to perform a method or operations as described herein. Program instructions may be written in any suitable high-level language, for example, Python, HTML, Ruby/Ruby on Rails, JavaScript, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether machine code on the bundle can be executed independently of another machine code. In other words, the modules may be high-level modules only.

Figure 2:
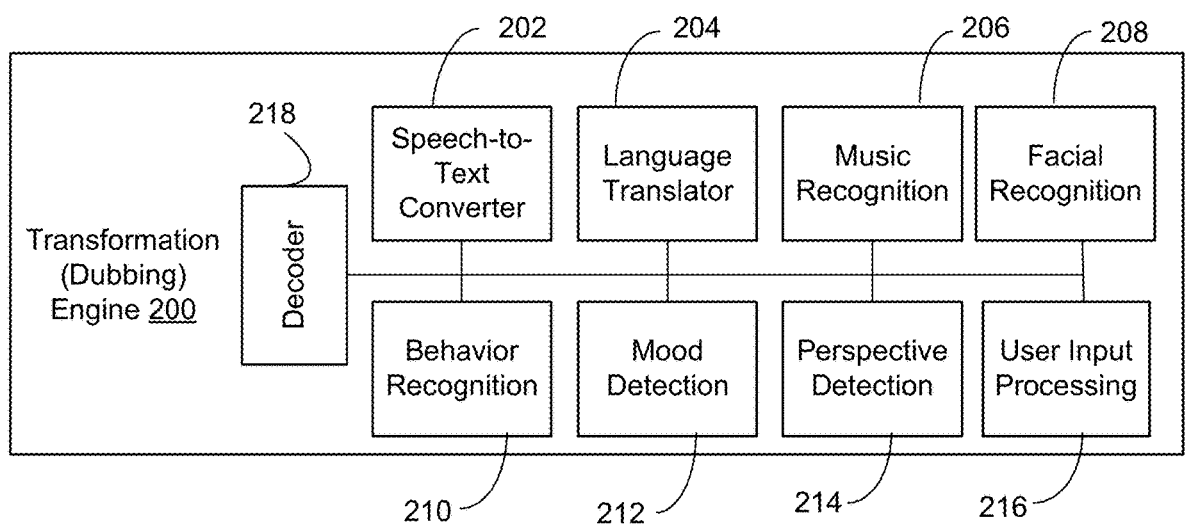
FIG. 2 is a block diagram illustrating aspects of functional modules making up an engine for performing methods for a content characterization process which involves transforming audio-video data as described herein.

FIG. 2 illustrates aspects of functional modules that may comprise an apparatus or application executed by the processor 102 of apparatus 100, such as a transformation engine 200, for performing methods for transforming audio-video data, according to one or more embodiments of the instant disclosure.

Embodiment 1: Automated Script Dubbing Process

For example, the transformation engine 200 may be a dubbing engine, which may be used in the context of dubbing dialogues in a media data 30. For example, the dubbing engine 200 may be used as a scripting tool that describes screen activity for use in foreign language film dubbing. A dubbing engine 200 or the like may also include other modules, for example a database module holding audio (such as voice and music) and parameter data or a chat module, which are not illustrated. Data signals generated by a user input device may be provided to a user input processing module 216. Based on the data signals and the context in which it is received (e.g., dubbing state at the time of receipt such as the version or the dubbing list generated), the data processing module 216 may set variables or write data to memory locations that are used by other modules of the dubbing engine 200, operating concurrently or sequentially with operation of the user input module 216. More detailed algorithms for performing functions of the dubbing engine 200 are described elsewhere below. It should be appreciated that the engine 200 need not include all the modules shown or described in connection with FIG. 2. Other useful combinations of the modules including combination in which one or more of the modules are omitted or one or more other modules are added would be apparent for those skilled in the art.

Speech to Text Conversion (Speech-to-Text Converter Module 202)

Figure 3:
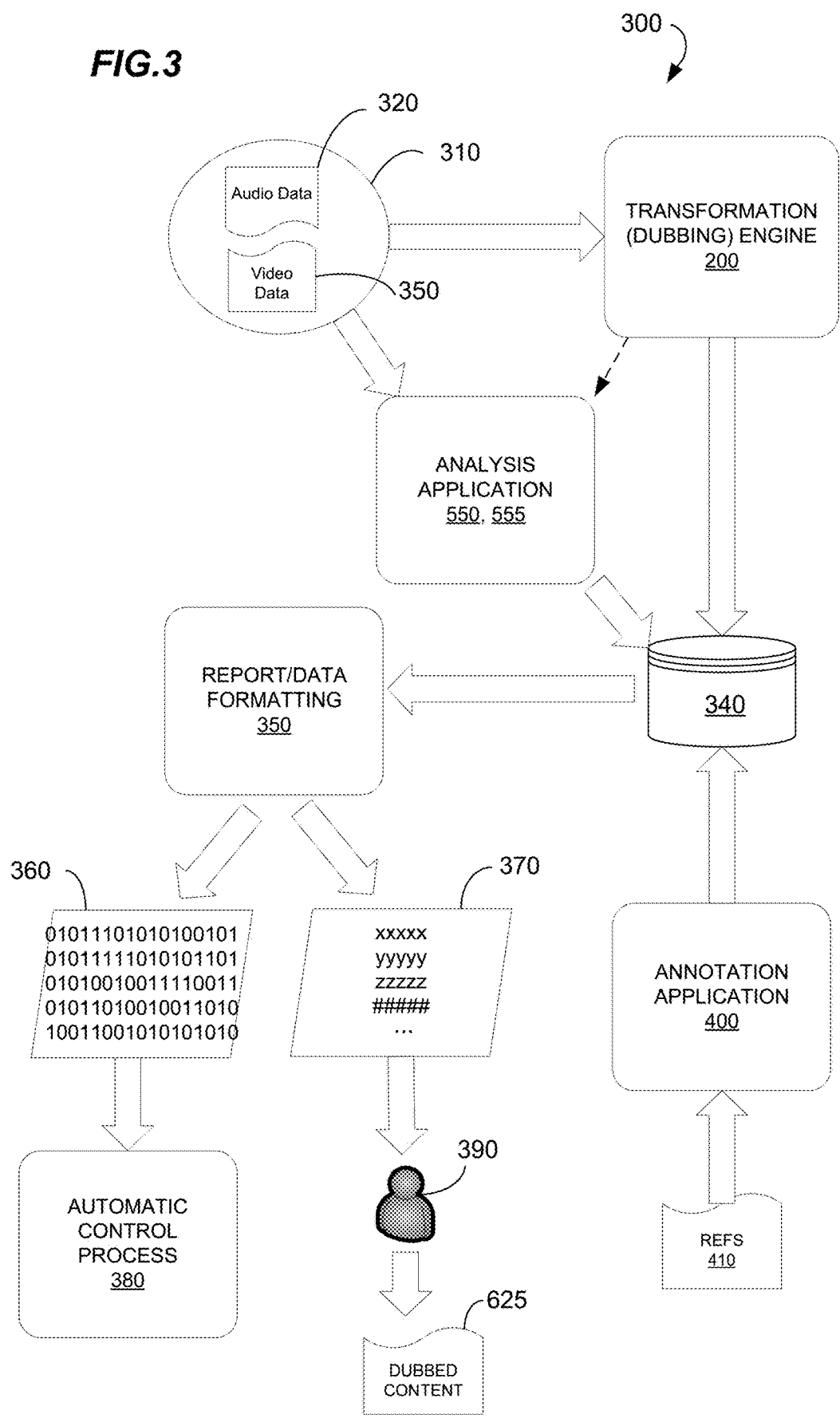
FIG. 3 is a block diagram illustrating aspects of input and output for performing methods for a content characterization process which involves transforming audio-video data as described herein.

Referring to FIG. 3, in one or more embodiments, the dubbing engine 200 may receive media data 310 that includes one or more recorded vocal instances. As used herein, "vocal instances" may include vocal utterances (human or non-human such as animals) such as dialogue, speech, audible background voices (TV, speech, radio, etc.). The vocal instances should be discernable by humans when played back at normal volume. For example, in some embodiments, the vocal instances are within the hearing range of humans. The dubbing engine 200 may include a speech-to-text converter module 202. In an implementation, the speech-to-text converter module 202 may extract the recorded vocal instances from an audio data 300 portion of the media data 30. The speech-to-text conversion may improve turnaround times of generating dialogue scripts compared to manual or semi-manual transcription known in the art, where it may take over a week to transcribe a single feature length film. Using speech-to-text conversion by the speech-to-text converter module 202 may also reduce time pressures to creative teams by supplying reference materials faster and more accurately for the dubbing.

As used herein, the term "speech-to-text converter" refers to any system capable of converting audio into a text representation or copy of the audio. The speech-to-text converter module 202 may also be referred as a speech recognition (SR) module, which may recognize the speeches into texts. Various speech recognition techniques may be used at the speech-to-text converter module 202. For example, a speech-to-text software application and the hardware suitable for executing such application that are known in the art would be considered a speech-to-text converter. A system that is configured to produce text from audio-video data may include a component that receives audio-video data, and a component that provides speech-to-text conversion.

In an aspect, the speech-to-text converter module 202 may detect characteristics of the recorded vocal instances such as stress, tonality, speed, volume, inflection and so on from the recorded vocal instances, encode the characteristics in a symbolic form, and record the symbolic indications for use in one or more downstream processes. For example, symbolic indications of speech characteristics may be used in a process that automatically generates annotations for use in dubbing.

In one or more embodiments, text information such as a closed caption, a subtitle, a script, a transcript and a lyric of a song obtained from the metadata that may be encoded in the media data 310 may be used by the speech-to-text converter module 202 to supplement or improve the accuracy of speech-to-text conversion. For example, in some embodiments, the speech-to-text converter module 202 may use the closed caption as an initial version of converted text and use audio data encoding speech to verify and correct the closed caption text. For example, the speech-to-text converter module 202 may convert a line of the closed caption and generate a first pronouncing sequence and convert the corresponding speech of the recorded vocal instance to a second pronouncing sequence. If the two pronouncing sequences are perfectly or statistically matched, the speech-to-text converter module 202 may determine that the line of the closed caption corresponds to the speech and adopt the same as the converted text. If the two pronouncing sequences are partially matched, the speech-to-text converter module 202 may adopt the matched part of the line, while replacing the unmatched part of the line with text from performing the speech recognition on the corresponding speech.

In some aspects of the disclosure, the timing information for the audio data 300 may be added by the dubbing engine 200 at certain points in the dubbing scripts (e.g., scripts that may be used for dubbing, such as a dialogue list and a spotting list) corresponding to each occurrence of audio instances including recorded vocal instances such as speech, music, background noise, sound, etc. For example, in case of a speech, the speech-to-text conversion process may include a time alignment process, in which time code, e.g., timing information for the converted speech, may be added in accordance with varied degrees of detail, such as a syllable, word, phrase, sentence, or paragraph. The time code may include the time-in and time-out information of a converted speech, respectively indicating the beginning and end of a speech by a given speaker. Similarly, the time alignment process can add respective timing information for the other audio instances. As a result, the engine 200 may generate a dubbing script that may include a dialogue list or a spotting list, supplemented with the timing information. Any suitable technique for time-alignment of a transcript with a dialog audio track using phoneme matching may be used.

Language Translation (Language Translator Module 204)

The dubbing engine 200 may further include a language translator module 204. As used herein, the term "language translator" refers to systems capable of converting audio or text from one language into another language. For example, the language translator module 204 may comprise translation software (e.g., software that is capable of converting text in one language to text in another language), which may or may not work in conjunction with human translators. Any suitable language translator may be used. Advances in machine learning have made language translation more accurate, but not fault-proof. The machine-translated results provide a baseline for improving the quality of dubbing, but are not solely determinative of final output. The output can be provided on a dubbing sheet along with other information for more rapidly evaluating the accuracy and quality of the machine translation without needing to watch the content being dubbed.

Song/Vocal Recognition (Music Recognition Module 206)

The dubbing engine 200 may further include a music recognition module 206.

In some implementations, the music recognition module 206 uses audio fingerprinting to recognize music content present in the media data 30. Any suitable technique for music recognition may be used. An audio fingerprint is a condensed, machine-generated digital summary generated from an audio signal, which can be used to identify an audio sample or quickly locate similar items in an audio database. Music identification using audio fingerprints may be used to monitor the use of specific musical works and performances on radio broadcast, records, CDs and peer-to-peer networks. In some implementations, the music recognition module 206 may be used to identify or verify music clearance information such as copyright compliance, licensing, and other monetization schemes for the recognized music content. In an aspect, symbolic indications of audio fingerprinting or recognized music may be used in a process that automatically generates annotations for use in dubbing.

Character Recognition: (Facial Recognition Module 208)

The dubbing engine 200 may further include a facial recognition module 208. As used herein, "facial recognition" refers to a technology capable of identifying or verifying a person from a digital image or a video frame from a video source. Multiple methods are known in which facial recognition systems work. For example, in some implementations, the facial recognition module 208 compares predetermined facial features from a given image or video frame with faces within a database. In some embodiments, the facial recognition module 208 may be an artificial intelligence (AI) based application that can uniquely identify a person by analyzing patterns based on the person's facial textures and shape.

In some embodiments, the facial recognition module 208 receives digital image decoded by the decoder 218, which it generates from a media data 310 received by the dubbing engine 200. In some embodiments, the decoder 218 may convert the video data contained in the media data 30, for example, a video data encoded in MP4, AVI, FLV, MOV, DVD (VOB), DVR-MS RM, MPEG file format or the like, into a digital image (or a seriate image), for example in JPG, BMP, GIF, TGA, TIF, PCX, PNG, and ICO file format or the like. The digital images may include data including still images and moving images. Alternatively, the facial recognition module 208 may receive digital image from the user input processing module 216, which may receive or process digital image input received by the computing apparatus 100 from a user.

In some implementations, the facial recognition module 208 detects the face of a person from the received digital image. The facial recognition or face detection can be performed by using a predetermined algorithm. For example, in some implementations, a convolutional neural network known in the art may be used, which hierarchically detects features including low-order features such as edges and high-order features such as eyes and a mouth and finally detects the barycentric position of the face. For example, a processor may implement a convolutional neural network to obtain the barycentric position of an eye or mouth. Of course, other features of a face may be used. For further example, a processor may implement an algorithm for analyzing the relative position, size, and/or shape of the eyes, nose, cheekbones, and jaw. These features may then be used to search for other images with matching features. Other known recognition algorithms that may be used by the facial recognition module 208 in one or more embodiments of the instant disclosure include principal component analysis using eigenfaces, linear discriminant analysis, elastic bunch graph matching using the Fisherface algorithm, the hidden Markov model, the multilinear subspace learning using tensor representation, and the neuronal motivated dynamic link matching. In an aspect, symbolic indications of recognized faces may be used in a process that automatically generates annotations for use in dubbing.

Behavior Recognition

The dubbing engine 200 may further include a behavior recognition module 210 for interpreting actions of characters on-screen, e.g., standing, sitting, laying down, walking, running and so forth. In some embodiments, the behavior recognition module 210 receives digital image decoded by the decoder 218, which it generates from a media data 310 received by the dubbing engine 200, similar to the case of the facial recognition module 208 described above. Alternatively, the behavior recognition module 210 may receive digital image from the user input processing module 216, which may receive or process digital image input received by the computing apparatus 100 from a user.

In some implementations, the behavior recognition module 210 detects or recognizes the action, gesture, and/or posture of a character (i.e., behavior) appearing in video data from the received digital images. This behavior recognition may be performed by using a predetermined algorithm for object recognition. Various techniques are known and may be applied to the present disclosure for behavior detection, for example, machine learning for object identification and motion analysis. In an aspect, symbolic indications of detected or recognized action, gesture, and/or posture of a person (i.e., behavior) may be used in a process that automatically generates annotations for use in dubbing.

The action, gesture, or posture detected by the behavior recognition module 210 may be performed by a body part of a person in the received digital image, e.g., a hand or a finger, but also may include other body parts. In one embodiment, the behavior recognition engine 210 may include a collection of action/gesture/posture filters, each comprising information concerning an action, gesture, or posture that may be performed by at least a part of a skeletal model. In some embodiments, the skeletal model is a model of a human skeleton. In other embodiments, the skeletal model is a model of non-human skeleton, or a model of a non-human body.

In some implementations, the behavior recognition engine 210 may compare the skeletal model, and the movements associated with it derived from the received digital image added to gesture filters in a gesture library, to identify one or more actions, gestures, or postures performed by the person in the received digital image. In some examples, matching an image data to image models of the person's body parts such as the hand or finger during a gesture may be used instead, rather than tracking the skeletal movements for recognizing the action/gesture/posture.

Mood Detection—Vocal Instances

The dubbing engine 200 may further include a mood detection module 212.

In some embodiments, the mood detection module 212 may receive the recorded vocal instances extracted by the speech-to-text converter module 202 from an audio data 300 portion of the media data 30. Alternatively, the mood detection module 212 itself may independently or complimentarily extract the recorded vocal instances from the audio data 300 portion of the media data 30.

Various techniques are known and may be applied to the present disclosure for vocal mood detection, for example recognizing emotion using only prosodic information of the voice by extracting statistical quantities of the intensity and pitch of the voice signal extracted from a voice sampling.

Pitch may be treated as a subjective quality of a sound that determines its position in a musical scale or voice spectrum.

It may be measured as the frequency of the pure tone of specified intensity that is judged by the average ear to occupy the same place in the musical scale or voice spectrum. Pitch may be measured in terms of a frequency (vertical axis) for a particular time value. Intensity is a measure of the sound energy integrated over a given frequency spectrum. In some embodiments, other acoustic features of the vocal instances may be used instead or in addition to the intensity and/or pitch, such as the speed and volume.

In some embodiments, the mood detection module 212 may extract a set of target features derived from the extracted recorded vocal instances, and process the set of extracted feature(s) for detecting an emotion. In some instances, the vocal instances may be low pass filtered prior to extracting the target features. The cut-off frequency for the low pass filtering may be centered around 250 Hz, or another suitable frequency may be used as the cut-off. In some implementations, the target features may be statistical quantities extracted from sampling the signals of the vocal instances representing the intensity and/or pitch of the extracted vocal instances. In an aspect, symbolic indications of detected mood may be used in a process that automatically generates annotations for use in dubbing.

Mood Detection—Color

To convey and maintain mood consistency in a scene, directors of audio-video works (e.g., filmmakers, cinema directors, live performance stage directors, performing artists, theatrical directors, animation directors, etc.) consider the effects of mise-en-scene (everything that appears in the framing, including actors, lighting, décor, props, costume, etc.; "placing on stage/screen"). For instance, directors may consider the colors in each scene, such as the colors of the costumes, the background colors (hues, saturation, and brightness), etc. Directors often incorporate color perception and lighting as important contributors to set mood tones in a scene, in addition to dialogues, storyline, actors, etc. Color may also be used to create particular surprising or artistic effects (for example, Kieslowski's "Blue," "White" and "Red").

In some embodiments, the mood detection module 212 may perform color-mood detection on the received media data 30. Various techniques are known and may be applied to the present disclosure for color-mood analysis, for example, color-mood analysis of films based on syntactic and psychological models. The decoder 218 may decode or convert the video data contained in the media data 30, such as the MPEG-1 input, into a series of image matrices in a specifically chosen color space. For example, the color space may be CIELUV. CIELUV may have the advantage of perceptual uniformity, i.e., the same distance between two different points makes equal perceived color difference. In some embodiments, utilizing color histograms, the decoder 218 may segment these videos into shots. In some embodiments, the decoder 218 (or alternatively, the mood detection module 218) may select certain frames as key-frames and compute a family histogram from key-frames. Key-frames may be selected based on a predetermined set of parameters, or they may be selected randomly.

In some embodiments, for each family histogram, the mood detection module 212 generates a color-mood detection value. For example, the color-mood detection value may be obtained by extracting the most dominant colors, for example, one to three dominant color, corresponding to the largest one to three bin value(s), and sets the weighted sum of the dominant color(s) as representing one representative dominant color (RDC) for each shot. In some embodiments, the number of dominant colors or the number of bin values may be greater than three. In an aspect, symbolic indications of detected color-mood may be used in a process that automatically generates annotations for use in dubbing.

Camerawork/Perspective Detection

The dubbing engine 200 may further include a perspective detection module 214. In some embodiments, the perspective detection module 214 may perform camera work analysis on the received media data 30. As known in the art, directors (e.g., movie directors) often do not just shoot a scene straight on without first getting to know the details of who a character is and why he or she is in a particular scene at a particular moment. A director typically studies the why and who of the character, and builds upon that knowledge through the use of camera angles and perspective.

In some embodiments, low angle of shooting is detected by the perspective detection module 214. Shooting a character from a low angle, with the camera looking up at them can make them appear bigger-than-life, confident, important or even a bully. A character who is supposed to be bigger than other characters around him is usually shot from a lower angle. For example, in *The Lord of the Rings*, a film series directed by Peter Jackson, Gandalf appears much taller than the rest of the characters and this angle gives him not just an exaggerated height but also a more powerful perspective.

In some embodiments, high angle of shooting is detected by the perspective detection module 214. Shooting a character from slightly above eye level with the camera pointing down can give them the innocent look of a child, make them appear harmless or subordinate to another character in the scene. For example, in *The Lord of the Rings*, Frodo was often shown with the shot slightly above him—the innocent little hobbit carrying the weight of Middle Earth on his small shoulders. But when he wrestled internally with doing the right thing by destroying the Ring of Power, his perspective changes and as he decides he is going to keep the Ring ("It's Mine!"), the perspective is shot from below and he becomes almost evil in his stance.

In some embodiments, point of view is detected by the perspective detection module 214. The point of view may be used to express character station. For example, shooting a point of view with the lens slightly above the camera implies that the subject is subordinate and less important. The subject looks up, implying a lower station if he is in conversation with someone who was shot at a slightly lower angle (e.g., boss/worker angles).

In some embodiments, the perspective detection module 214 receives digital image decoded by the decoder 218, which it generates from a media data 310 received by the dubbing engine 200. In some implementations, the perspective detection module 214 detects the camera angle or a point of view used to shoot a person appearing in the received digital image. The perspective detection (detection of camera angle or point of view) can be performed by using a predetermined algorithm. For example, an algorithm used by the facial detection module 208 or the like may be used by the perspective detection module 214. For example, the perspective detection module 214 may apply photogrammetric relationships with object detection to classify the camera angle relative to actors or other objects appearing in the frame. In an aspect, symbolic indications of detected perspective may be used in a process that automatically generates annotations indicating the classification of camera angle for use in dubbing.

As shown in FIG. 3, the content characterization (dubbing) engine 200 may be combined with one or more other applications 400, 500, 550 described in connection with FIGS. 4 and 5. Functions of the applications or engines 200, 400, 500, or 550 may be combined variously in any one or plurality of different applications, engines, or modules. The specific arrangement shown in FIG. 3 is for convenient example only. FIG. 3 shows an overview of a process 300 that accepts input, for example media data 310 that may include audio data 320 and video data 350 or reference information 410, and outputs a dataset 340 for storage in a computer memory. A report writing or data formatting module 350 may access the dataset 350 to produce one or more reports, for example, a package of machine-readable metadata 360 or a human-readable dubbing sheet 370 formatted to enable a human user 390 to prepare accurately dubbed content 625 in an efficient manner. The automatic control process may be used to operate a machine for interacting with humans, for example, a social robot, content curator, or media player.

Figure 4:
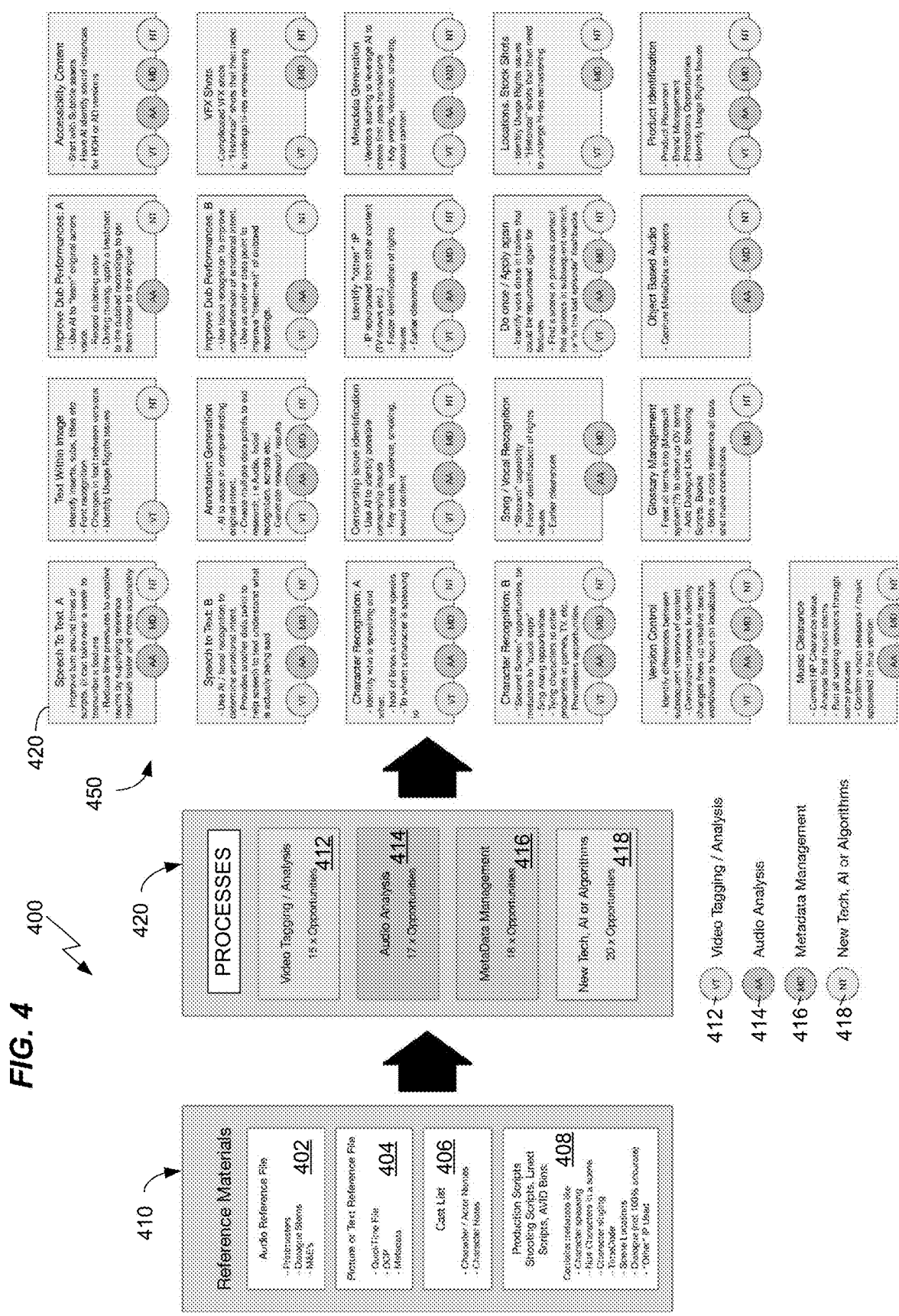
FIG. 4 is a conceptual diagram illustrating further functional components that make up an application(s) for performing methods for a content characterization process which involves transforming audio-video data, including annotations that may be generated as described herein.

FIG. 4 illustrates an example of a system 400 for analyzing media content to using a set of function 450 useful for preparing or annotating a dubbing sheet that may be generated using methods for content characterization process, as described herein. Inputs 410 ("reference materials") may include an audio reference file 402 with metadata, a picture or text reference file 404 which may be derived from video frames or other image content, with metadata, a cast list 406, and various forms of scripts 408. Processes 420 operating on these or similar inputs may include video tagging and analysis 412, audio analysis 414, metadata management or analysis 416, and machine learning algorithms 418. The processes 420 represent a more general categorization of the technical processes described in connection with FIG. 2 above. The functions 450 each provide a different information output of the processes 420 coded as 'VT' for video tagging 412, 'AA' for audio analysis 414, 'MM' for metadata management 416 and 'NT' for "new tech" machine learning algorithms 418. For example, the function 422 at upper left describes computerized speech recognition using improved NT algorithms 418, metadata management 416 and audio analysis 414. For the sake of brevity, the reader is referred to FIG. 4 for the remaining functions 450 and related outputs. Output from the functions 450 may be used as part of, or an entirety of a dataset for creating a dubbing sheet Creative Intent Analysis Referring to FIG. 5, further examples of a method or methods for content characterization with transformation of audio-video data, as may be performed by the processing environment 100 or other computing apparatus described herein. In an aspect, an analysis application 550 analyzes the outputs generated by the transformation (dubbing) engine 200 to determine the semantic encoding in the respective outputs, or operates in parallel to the dubbing engine 200 to provide additional information from the same audio, video, and/or reference information sources. By way of example, the application 550 includes an audio analysis component 552, facial expression analysis component 554, an age/sex analysis component 556, the action/gesture/posture analysis component 558, the mood analysis component 560, and perspective analysis component 562. Each of the modules or components of the analysis application 550, including the audio analysis 552, the facial expression analysis 554, the age/sex analysis 556, the action/gesture/posture analysis 558, the mood analysis 560, and the perspective analysis 562 cooperate to provide an indication of an emotional tone of a scene or state of a character in a scene that is being analyzed. Each of the analysis components matches recognized inputs (visual or audible) detected by the corresponding detection/recognition modules 202, 206, 208, 210, 212, and 214 to an interpretation of that input relative to a semantic encoding database 510. Each of the individual components 552, 554, 556, 558, 560, and 562 isolates and recognizes a behavior or condition which can be compared to a corresponding emotional state in database 510. As each interaction will have multiple recognized behaviors occurring simultaneously, the analysis application 550 weighs any combination of inputs and associated behaviors at a given time and derives a conclusion about an emotional state to report feedback on the given inputs.

Figure 7A:
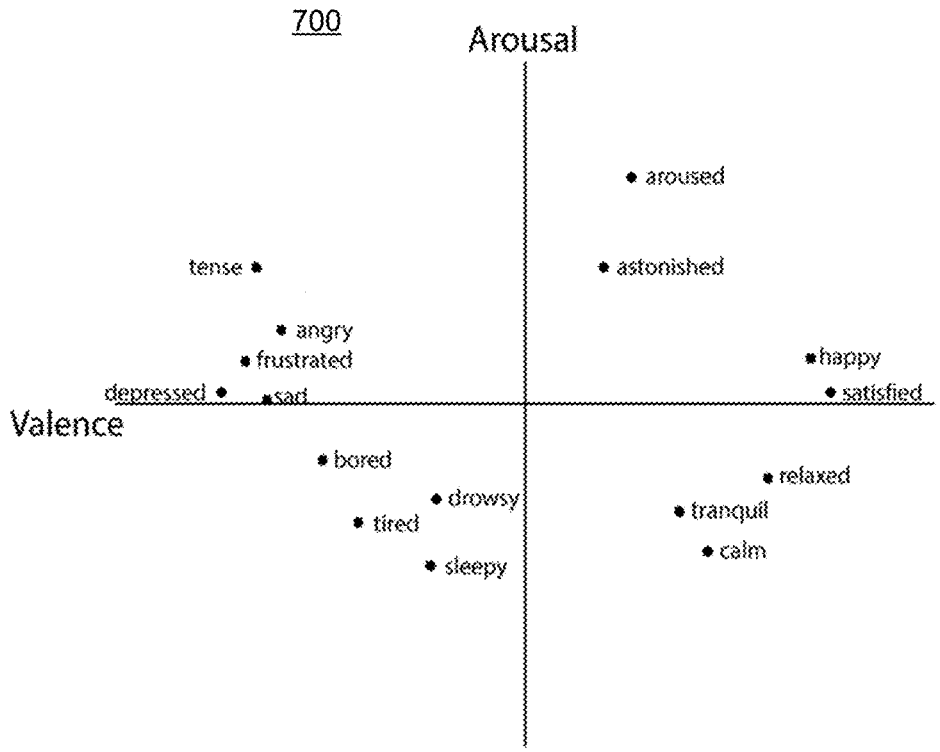
FIG. 7A shows an arrangement of emotional states relative to axes of a two-dimensional emotional space.

In some implementations, the analysis application 550 uses a machine learning algorithm to correlate semantic encoding for the input received from (one or more modules of) the transformation engine 200 as discussed in detail below to an emotional indicator. Optionally, the machine learning algorithm may be configured to process context-indicating data in addition to the input from the transformation engine 200, which may improve accuracy. Context-indicating data may include, for example, character speaking, number of characters in a scene, character singing, time code, scene location, dialogue, and so forth. For example, if the scene location is a funeral home, the emotional indicator may be biased toward sadness, and if the scene location is a child's birthday party, the emotional indicator may be biased toward happiness, etc. An emotional indicator may be a symbolic value that relates to an emotional intent for a vocal instance intended by the director. The indicator may have constituent elements, which may be quantitative or non-quantitative. For example, an indicator may be designed as a multi-dimensional vector with values representing intensity of psychological qualities such as arousal, and valence. In some embodiments, other qualities such as cognitive load may also be represented. Valence in psychology is the state of attractiveness or desirability of an event, object or situation; valence is said to be positive when a subject feels something is good or attractive and negative when the subject feels the object is repellant or bad. Arousal is the state of alertness and attentiveness of the subject. Examples of emotional states or vectors in a two-dimensional valence-arousal space is shown in FIG. 7A, while 7B shows emotional states or vectors in a three-dimensional valence-arousal-dominance space. Both Figures are discussed in more detail below. The machine learning algorithms may include at least one supervised machine learning (SML) algorithm, for example, one or more of a linear regression algorithm, a neural network algorithm, a support vector algorithm, a naïve Bayes algorithm, a linear classification module or a random forest algorithm.

a. Audio Analysis

In some embodiments, determination of emotional states can include analysis of audible and visual inputs. In some implementations, the audio analysis component 552 determines emotions such as joy, anger, sadness, and pleasure expressed in the vocal instances detected by the speech-to-text converter module 202. Audible inputs can include expression, speech and word analysis, word choice and syntactic framing of utterances, and speech pace, rhythm, and pitch contour all provide indications of an analyzed character's expressed or intended emotional state. In addition, the character's gestures, expressions, and body language all reflect emotional state.

In some embodiments, the audio analysis component 552 may implement a process for emotion detection. For example, the audio analysis component 552 may operate by sampling the vocal instances detected by the speech-to-text converter module 202 and breaking it into a continuous sequence of consecutive audio windows each less than one second, for example, 0.5 seconds. The audio analysis component 552 may normalize the volume of each audio window to utilize the full dynamic range of the chosen audio format (e.g., 16 kHz mono). Modeling the audio input as a combination of a linear filter (vocal tract) and excitation signal (vocal cords), the audio analysis component 552 may separate the resonance frequencies (formats) into linear resonances 514 carrying phoneme information and non-linear features mappable to emotional states by linear predictive coding (LPC). Other useful separation processes may include, for example, Mel-frequency cepstral coefficients (MFCC), and perceptual linear prediction (PLP).

The audio analysis component 552 may apply a deep neural network to derive a time-varying sequence of speech features (e.g., phoneme morphologies). The processor parameterizes the non-linear features by any useful model for representing an emotional state of the character/vocal instance. For inferring emotion from audio data, the processor may use a data-driven, machine learning process that produces an n-dimension emotion vector representing an emotional state, where 'n' is a number large enough to represent emotional states that affect facial expression during speech but not so large as to render the training process too specialized to the input. Manual coding of emotional states may provide another option, or generating the emotion vector from other data, for example, non-photographic biometric data collected during recording of the reference video. Any useful method may be used to derive emotion data time-correlated to the character speaking the lines in the reference video, if used.

b. Facial Expression Analysis

In some implementations, the facial expression analysis component 554 determines six basic facial expressions such as joy, anger, sadness, and pleasure expressed in the facial expression of a face in the digital image detected by the facial recognition module 208. For example, the facial recognition module 208 may obtain basic facial expression evaluation values corresponding to a happy face, a sad face, an angry face, a fearful face, a disgusted face, and a surprised face, and outputs them as facial expression evaluation values for the detected face in the digital image. The facial recognition module 208 is not limited to the six basic facial expressions such as joy, anger, sadness, and pleasure, but may also calculate other useful evaluation values.

Calculation of evaluation values of the six basic facial expressions such as joy, anger, sadness, and pleasure may be implemented by a known technique in the art. For example, a processor may calculate change amounts for a feature amount of each portion from the difference between a feature amount (e.g., a distance Y1 between a corner of an eye and a corner of the mouth in the Y direction in FIG. 6) of predetermined portion group obtained from an expressionless image prepared in advance and a feature amount (e.g., a vertical distance between a corner of an eye and a corner of the mouth) of predetermined portion group obtained from an input image. The evaluation value (score) for each facial expression is calculated from the change amounts for the predetermined portion group. Alternatively, and as another non-limiting example, determining the facial expression of the detected face in the digital image has three stages: (a) face detection, (b) feature extraction and (c) facial expression recognition. The first phase of face detection may involve skin color detection using YCbCr color model, lighting compensation for getting uniformity on face and morphological operations for retaining the required face portion. The output of the first phase may be used for extracting facial features like eyes, nose, and mouth using AAM (Active Appearance Model) method. The third stage, automatic facial expression recognition, may involve simple Euclidean Distance method. In this method, the Euclidean distance between the feature points of the training images and that of the query image is compared. Based on minimum Euclidean distance, output image expression is decided. Alternatively, the proposed method may be further modified by using Artificial Neuro-Fuzzy Inference System (ANFIS) to give a better recognition rate compared to other known methods. For further example, a deep neural network may perform facial recognition and expression recognition after being trained on a training set.

c. Age/Sex Analysis

In some embodiments, the age/sex analysis component 556 performs an authentication (detection) process for the face of the person detected from the received digital image. In an authentication process, either or all of an individual authentication, age authentication, and sex authentication may be performed. Various techniques are known and may be applied to the present disclosure for individual authentication, for example, any useful method for facial recognition as described in connection with facial recognition module 208.

For age authentication, a training set of average faces of the respective age groups may be prepared in advance. Matching may be performed by the facial recognition module 208 between the average face of each age group with the face of the person detected from the received digital image. Using estimation, the age group exhibiting the highest similarity is determined to be the age group to which the face of the person detected from the digital image belongs. In an aspect, average faces of the respective age groups may be generated based on a large quantity of acquired normalized images of the respective age groups (e.g., 0 to 10 years, 10 to 20 years, and 20 to 30 years).

In one or more embodiments, for sex authentication, sex-specific average faces are prepared in advance, and matching is performed by the age/sex analysis component 556 between the sex-specific average faces and the face of the person detected by the facial recognition module 208. Using estimation, the sex exhibiting the highest similarity is determined to be the sex corresponding to the face of the person detected from the received digital image. Sex-specific average faces may be generated based on a large quantity of acquired normalized images of the respective sex groups.

d. Action/Gesture/Posture Analysis

In some embodiments, the action/gesture/posture analysis component 558 may determine the emotion associated with the action/gesture/posture detected by the behavior recognition module 216. For example, in some embodiments, the posture of a person detected in the received digital image that is slouching in a chair is likely to indicate that the person is bored. Similarly, the posture of the person sitting upright and appearing attentive can be indicative that the person is interested. Alternatively, in some embodiments, the gesture of a person detected in the received digital image that is shrugging her shoulders is likely to indicate that the person is puzzled or indifferent. Similarly, the gesture of a person detected in the received digital image that is burying one's head in her hands can be indicative that the person is distressed or in disbelief.

e. Mood Analysis (1) Vocal Instances

In some embodiments, the mood analysis component 560 may use one or more automated learning (e.g., machine or meta learning) methods known in the art to assess the measurements on the different target features extracted by the mood detection module 212, using one or more emotion recognition algorithms. Examples of the learning algorithms that may be used as the emotion recognition algorithm include, but are not limited to: 1-NN, 3-NN, 10-NN, Decision tree/C4.5, Decision Rules/PART, Kernal Density, KStan, Linear Regression, LWR, Voted Perceptrons, SVM1, SVM2, SVM3, VFI, M5Prime, Naïve Bayes, AidaBoost M1/C4.5, and AidaBoost M1/PART. A given algorithm used by the mood analysis component 560 may indicate the discerned emotion (e.g., calm, happy, etc.) and various internal parameters. The mood analysis component 560 may thus execute different emotion recognition algorithms and produce their respective results and internal parameters.

In some embodiments, the mood analysis component 560 may process three different signals: i) the intensity of the signal after low-pass filtering, ii) the intensity of the signal without low-pass filtering, and iii) the pitch of the signal without low-pass filtering. In other embodiments, other signals may be processed, and their respective values may be obtained. Next, in some embodiments, after all these values are obtained for each signal of vocal instances, one or more suitable automated learning methods may be executed by the mood analysis component 560.

In some implementations, all executed algorithms may be attributed to all the (normalized) features and may be trained, for example, on 90 percent of the database and tested on the remaining 10 percent. Other percentages may be employed, including 0 percent of the database.

In some embodiments, the emotion analysis performed by the mood analysis component 560 may be frozen in its parameters and programming (i.e., closed algorithm), or it may be adaptable to some degree to update its parameters and programming, for example, on the basis of user feedback response via user input processing module 216, in order to correct errors or to coach in emotion detection.

In some other embodiments, there is no initial set emotion recognition algorithm. Rather, a teaching algorithm may be provided that analyzes the different features extracted by the mood detection module 212 and user feedback via input processing module 216, or user indications of the emotions that are to be inputted or detected via user input interface 104 or sensor 106. From one or more of these user inputs/feedbacks, the teaching algorithm develops a specific online emotion recognition algorithm, which may be continually modified, updated and improved with growing user input and feedback.

(2) Color

In some embodiments, the mood analysis component 560 determines the mood associated with the color-mood detection value obtained by the mood detection module 212. In some implementations, the mood analysis component 560 adopts the association of corresponding colors to mood tones (emotions). For example, the mood detection module 212 may utilize a color-mood tone association, for example as summarized in Table 1 below.

TABLE 1

Color-Mood Tone Associations

| Color | Mood Tone (Emotion Term) |
| --- | --- |
| Black | Hatred, Mourning, Sorrow, Indefinite |
| White | Mourning, Grief, Depression |
| Red | Love, Hatred, Life, Noble |

TABLE 1-continued

Color-Mood Tone Associations

| Color | Mood Tone (Emotion Term) |
| --- | --- |
| Orange | Jovial, Happy |
| Yellow | Happy, Luminous, Jovial |
| Green | Tranquility, Peace, Life |
| Blue | Peace, Tranquility, Noble |
| Purple | Love, Noble, Authoritative |

In some embodiments, the mood analysis component 560 may determine a mood tone of a scene based on the RDC for the scene and the color-mood tone associations. The RDC for the scene may be set based on one or more key frames appearing in the scene.

In some embodiments, the analysis component 560 may determine a mood dynamics based on the transitions of scenes detected by the mood detection module 212. Directors may compose not only color-distribution in a scene, but also the transitions between scenes, to affect human feelings. The transitions of colors between shots may lead to mood dynamics. For example, in some embodiments, the mood detection module 212 may acquire mood dynamics from the statistics of color transitions in a movie palette (MP). In some implementations, MP may consist of a sequence of the reference colors closest to those in RDC, for all shots. Various statistical equations may be used by the mood detection module 212, for example, content engagement power (CEP) as described by Arvel Chappell et al. in international (PCT) Application No. PCT/US2018/053614.

In some embodiments, the mood analysis component 560 may use features such as the pace, dominant color ratio, or the family histogram to determine (the finer category of) mood tones. For example, dominant color ratio (DCR may be defined by an equation:

$$DCR = |Pd|/|P|,$$

where Pd is the set of dominant color pixels, and P is the set of all pixels in a frame.

Shots that have fewer dominant colors are regarded as having higher DCR.

In some embodiments, 3 possible categories for DCR may be set: high(3), medium(2), and low(1). Other categories may also be set.

Pace may be defined as the ratio of the number of shots over the total number of frames. Family histogram may be defined as a merged histogram of shot's keyframes. In some embodiments, the mood analysis component 560 may determine a mood tone of a scene based on a lighting of the scene detected by the mood detection module 212. For example, the mood detection module 212 may determine a high-key lighting or a low-key lighting. High-key lighting is often seen in romantic comedies and musicals, encompassing an even lighting pattern and avoiding dark areas in the frame. Everything appears bright with little to no shadow at all. Low-key lighting: often seen in horror movies and thrillers, encompassing a lighting pattern that has both bright and dark areas in the frame. The chiaroscuro (Italian: bright-dark) technique, long used by painters, is characterized by strong contrast, often employed to unnerve the audience. In some embodiments, processing environment 100 may be communicably connected to an analysis server 570 via a communication network 50 (similar or identical to communication network 614). Lighting may be classified by fitting histograms of video frame to it closest characteristic type, or by any other suitable method.

The analysis server 570 may include an analysis application 555, which includes one or more analysis applications similar or identical to the analysis components 552, 554, 556, 558, 560, and 562. The analysis server 570 may also include semantic encoding database 580, which may be similar or different to semantic encoding database 510. The functionalities of the analysis application 550 in the present method for transforming audio-video data as described herein may be augmented or supplanted by the analysis server 570.

Collaborative Transformation Processing

FIG. 6 shows aspects of a system 600 including different users 610, 612 performing the method for transforming audio-video data as disclosed herein, such as the dubbing processes 606, 608 operating on separate computing machines 602, 604 that are in communication via a network 614 to a database server 616. The dubbing processes 606 and 608 may correspond in terms of environments, media data, or any portion thereof, for example, they may be the same or compatible versions of the same media data. However, the instances 606 and 608 may be completely independent, asynchronous processes running at different times (i.e., not in synchrony with the primary dubbing process), with or without any overlapping time when both are running.

The database server 616 may be made up of several components. Each component may reside on one or more physical servers. The components may be implemented as software applications or modules which perform one or more functions. For example, one component may be both a web server and a video encoder. Alternatively, one component may be a message, voice and text server at the same time. Alternatively, each component may be an individual, interconnected piece of software. In yet another alternative, each of the components may be a part of a single integrated software.

The database server 616 may store media data 618 (similar or identical to media data 310 in FIG. 3) in a data structure (e.g., a table or relational database) that relates users 610, 612 through a mutual working relationship for a given dubbing assignment (e.g., transcriber, translator, voice actor, etc.) or the like.

The media data 618 may be stored in one or more repositories local to the server 616, such as one or more hard drives or a solid state drives and the like. Alternatively, the media data 618 may be stored in one or more repositories at a remote location, such as a media server, which may be suitable for storage of multimedia content. Each of computing machines 602 and 604 may also have access to their own media data repository, similar to storage 116 in FIG. 1. The functions of these elements may be similar to those for the database server 616. These repositories may be local or remote, as described above. Alternatively, these repositories may be at other locations on the internet in which media data 310 such as audio or video data made or accessible by the machines 602, 604, or the database server 616 are placed, for example, other media data accessible on the internet, which have been uploaded to a video sharing site or other file locations or portals.

The server 616 may also operate a communications process in coordination with the dubbing processes 606, 608. A communications process may manage and facilitate communications between users 610 and 612, and respond to user requests and/or events of the dubbing processes 606, 608. For example, the communications process may provide interface for exchanges of data such as the media data 310, the dubbing sheet 370, or any portion thereof, and further allow the users 610 and 612 to exchange user-to-user voice and text-based chats or email communications. Of course, the number of users (i.e., 610 and 612) illustrated herein are for example only, and it is to be understood that multiple users greater than two may participate in the network 614 and perform the method for transforming audio-video data as disclosed herein. The users 610, 612 may refer to the dubbing sheet 370 via a computer workstation, terminal, personal computer, laptop, notepad computer, mobile device, or similar user-facing node to create and edit a more culturally and artistically accurate copy of dubbed content 625, which may be held in a computer data store 620 for distribution to end users. Thus, the methods and apparatus described above are part of a process for transforming media content such as recorded original video, cinematic, or mixed reality content to a dubbed version for cross-cultural enjoyment.

FIG. 7A shows an arrangement 700 of emotional states relative to axes of a two-dimensional emotional space, in which the parameters "valence" and "arousal" are expressed along horizontal and vertical axes respectively. The valence axis ranges from negative to positive values, while the arousal axis ranges from low to high values. The origin point of these axes, which is at the center of the chart, corresponds to a neutral emotional state. Four quadrants of the emotional space represent differing emotional states, as follows: happy/aroused (quadrant Q1) characterized by positive valence and high arousal, relaxed/calm (quadrant Q2) characterized by positive valence and low arousal, bored (quadrant Q3) characterized by negative valence and low arousal, and angry (quadrant Q4) characterized by negative valence and high arousal.

Figure 7B:
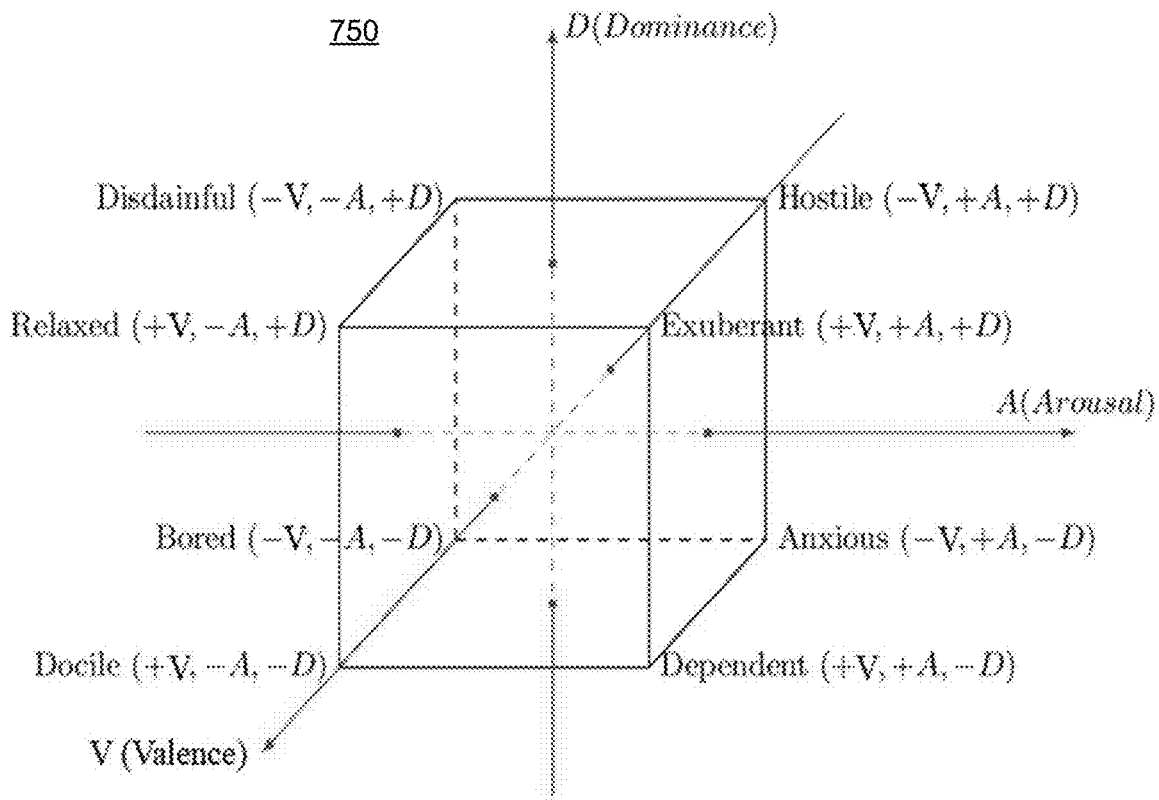
FIG. 7B shows a three-dimensional model of an emotional space.

Emotional spaces may be characterized by more than two axes. FIG. 7B diagrams a three-dimensional model 750 of an emotional space, wherein the third axis is social dominance or confidence. The model 750 illustrates a VAD (valence, arousal, confidence) model. The 3D model 750 may be useful for complex emotions where a social hierarchy is involved. An engine as described herein may compute emotional content quantitatively using one or more emotional spaces as illustrated by FIGS. 7A-B and use quantitative scoring to classify emotional elements for use in dubbing lists or interpreting semantic messages.

Example Algorithms for the Claimed Methods

In view of the foregoing, and by way of additional example, FIGS. 8-11 show aspects of a method or methods for content characterization process which involves transforming audio-video data, as may be performed by the processing environment 100 or other computing apparatus described herein. Referring to FIG. 8, a computer-implemented method 800 may include various operations, of which the illustrated blocks are examples. The method 800 may omit some of these operations, may include additional or modified operations depending on application design, or may perform the operations in a different sequence than described or in parallel. Any operative arrangement may be useful.

For example, the method 800 may include, at 810, receiving, by one or more processors, the media data 310 comprising one or more recorded vocal instances. For example, the processor may, in executing a dubbing engine, receive a QuickTime file encoded in 24 fps, including burnt in time code, Audio PM Track 1, and Dial Track 2. The received media data may also include audio reference files or audio tracks such as Printmasters, Dialogue Stems, Music & Effects (M&E), or the like. The received media data may include, for example, picture or text reference files, such as QuickTime files, DCP, metadata, or the like. The received media data may further include a cast list that may include character or actor names, cast played by a child (which will require child dubbing actors, to account for Child Protection laws in certain countries), character notes, synopsis, story arc/major plot points, and glossary. The received media data may further include production scripts, shooting scripts, lined scripts, and AVID bins, which may include metadata such as: the character speaking, number of characters in a scene, identity of character singing a song, time codes, scene locations, dialogues, and identification of third-party intellectual property rights (e.g., a TV in the background of a scene playing a television program, such as "Friends," that may not be licensed for use in the received media data).

The method 800 may further include, at 820, extracting, by the one or more processors, the one or more recorded vocal instances from an audio portion of the media data 370 using an audio analysis technique as described herein above. For example, extracting the one or more recorded vocal instances may include transcribing dialogues and listing the character who speaks at any given time and to whom. In one or more embodiments, audible background voices (TV, speech, radio, etc.) may be picked up and transcribed, thereby avoiding describing such voices as "inaudible" or "indistinct" in the final dubbing script, instead of transcribing what is being said.

The method 800 may further include, at 830, assigning, by the one or more processors, a time code to each of the extracted vocal instances, correlated to a specific frame of the media data. For example, assigning the time code may include adding frame accurate time codes to each narrative instance, dialogue, vocals, titles, etc., that appear in the media data 370. In some implementations, assigning the time code may be done by using a technique for time-alignment of a transcript with a dialog audio track using phoneme matching, or the like.

The method 800 may further include, at 840, converting, by the one or more processors, the extracted recorded vocal instances into a text data. For example, the conversion may be performed by the processor 102 and may be instantiated by the speech-to-text module 202 described above in reference to FIG. 2 and elsewhere herein. In some instances, it may be desirable to perform pre-processing before converting the extracted recorded vocal instances into the text data, for example, to remove or reduce unwanted non-speech audio information or modify the audio information to maximize the performance of the voice recognition.

The method 800 may further include, at 850, generating, by the one or more processors, a dubbing list 370 comprising the text data and the time code. The dubbing list 370 may contain a dialogue list, a spotting list, or both. In some embodiments, a separate dialogue list and a spotting list may be created simultaneously.

The method 800 may further include, at 860, displaying, by the one or more processors, a selected portion of the dubbing list corresponding to the one or more vocal instances. For example, a selected portion of the dubbing list 370 generated by the processor 102 may be displayed on the display 110 or some other display communicably connected to the processor 102. In some implementations, the dubbing list may contain a dialogue list, a spotting list, or both, and the two lists may be displayed simultaneously. In some embodiments, the two lists are not displayed simultaneously, but they may be displayed interchangeably in response to the user control input described above.

The method 800 may further include, at 870, assigning, by the one or more processors, a set of annotations corresponding to the one or more vocal instances, the set of annotations specifying one or more creative intents of the one or more vocal instances. In some embodiments, the annotations may include additional information or context for ensuring that the creative intent expressed in the media data is understood, wherein a human transcriber assigned with a task of creating a script or transcript for audio dubbing of a media data does not need to engage in any external research in order to turn around a "first pass" quickly. In some embodiments, the annotations may include additional information or context for ensuring that the creative intent is understood, wherein the transcriber requires additional research to complete the annotations. For example, annotations may focus on explaining any idioms, irony, play on words, etc., that appear in the audio data. Preferably, annotations should be consistent between the dialogue lists and spotting lists, but they may or may not be identical in some instances. Annotations may include not only definitions of words, but also explanations of slangs, play on words, metaphors, and anything difficult for non-native speakers of a first language (e.g., English) to understand. In some embodiments, annotations may include description of scenes for rotoscoped content. In some implementations, the annotations may include additional information or context for ensuring that the creative intent is understood, while accounting for rotoscoped imagery, making clear who is speaking and to whom. For example, a speaker or character should be specified accurately, especially for rotoscoped content, and who is speaking to whom should always be clarified; e.g., "Andy to Mike". In some implementations, the annotations may be useful to know when "you" refers to one person or more than one, in case of ambiguity.

The method 800 may further include, at 880, generating, by the one or more processors, the scripting data comprising the dubbing list and the set of annotations. Scripting data comprises computer-manipulatable symbols, instructions or datasets for creating a script, subtitle, or a dub, that may be in computer- or human-readable form. For example, the scripting data may be generated as a computer-readable file compatible for use with scripting, subtitling, and/or dubbing software. Other compatible file formats that are known or come to exist in the future, may also be used.

Figure 9:
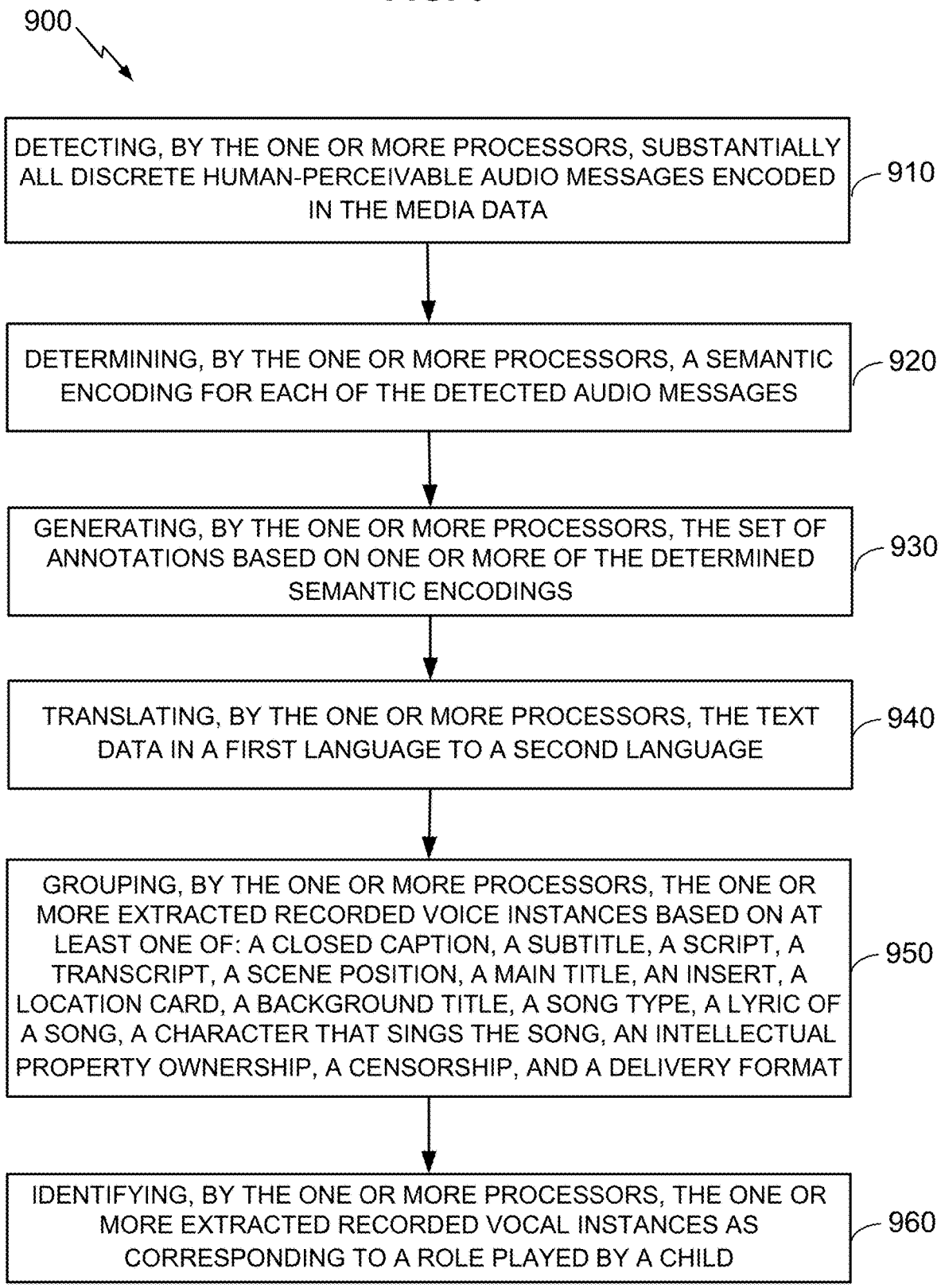

The method 800 may include any one or more of the additional operations 900 shown in FIG. 9, in any operative order relative to other operations of the method 800, or in parallel to other operations if possible. For example, the method 800 may further include at 910, detecting, by the one or more processors, substantially all discrete human-perceivable messages encoded in the media data. As used herein, "messages" is defined as in information science to include both speech and text, as well as other symbols with meaning. Discrete means "independent" or "defined by discontinuities." For example, human-perceivable messages may include an utterance or semantically significant sound by a character or other source; words, speech; the characteristics of the recorded vocal instances such as stress, tonality, speed, pace, rhythm, volume, inflection, pitch contour, and so on; word choice and syntactic framing of utterances; songs; music; behavior; facial expressions; gesture; posture; body language; age; sex; color; camerawork/perspectives, and so on. "Message" can also include non-audio messages, such as pictures, signs, graphical data, and video. Human-perceivable messages can include inaudible video messages, e.g., signs, shop fronts, newspaper headlines, news ticker tape on a TV, books, narrative titles (such as place names, "ten years later," etc.) or the like.

The method 800 may further include, at 920, determining, by the one or more processors, a semantic encoding for each of the detected audio messages. Semantic encoding may be information that define or suggest an intent (e.g., creative intent of a director for a scene, or an intent of a human owner of a personalized pet robot speaking to the robot) associated with the detected messages. For example, semantic encoding may include emotional state of a scene or a character in a scene that is being analyzed, or the human owner of a personalized pet robot, such as such as joy, anger, sadness, and pleasure.

The method 800 may further include, at 930, generating, by the one or more processors, the set of annotations based on one or more of the determined semantic encodings. Annotations may be defined as one or more sets of messages (such as text, icon, symbol, or the like) that represent information or context for aiding understanding or acknowledgement of a creative intent (e.g., of the director of a film) or intent (e.g., of the human owner of a personalized pet robot), e.g., by a transcriber, or by the personalized pet robot, respectively. In some embodiments, annotations may focus on explaining any idioms, irony, play on words, etc. Preferably, annotations are consistent between a dialog list and spotting list. In some implementations, annotations are not just definitions of words, but they provide explanations of slangs, play on words, metaphors, or anything difficult for non-native speakers of English to understand. In some embodiments, annotations provide a description of scenes for rotoscoped content. For example, annotations may include character's emotion (emotional indicator), description of scene/situation (e.g., for rotoscoped content or otherwise), social status of characters in a dialogue, explanation of idioms, irony, play on words, slangs, metaphors, language ambiguity (plural vs singular of you), censorship/offensive content (e.g., God References, Smoking, Animal Cruelty, Violence, Modesty, Sexual Content, Language, Jeopardy or scary content), closed caption, subtitle, script, transcript, scene position, main title, insert, location card, background title, song type/genre, lyric of a song, character that sings the song, intellectual property ownership (e.g., for title work contained within the image such signs, shop fronts, newspaper headlines, news ticker tape on a TV, books, etc.), delivery format (for the dubbing list), a description of changes between first and subsequent versions of the dubbing list, line spoken off screen, foreign language being spoken, a role player by a child, and so on. For example, an annotation may include a change list that covers changes not only in lines but also in breath, pause, cuts (that would affect the length of the dubbing), etc.

The method 800 may further include, at 940, translating, by the one or more processors, the text data in a first language to a second language. For example, the text data may be a dialogue converted by the speech-to-text converter for a film released or to be released in the United States, and intended to be also released in foreign territories, such as France. In such example, the first language may be English, and the second language may be French. Of course, other language combinations are possible.

The method 800 may further include, at 950, grouping, by the one or more processors, the one or more extracted recorded vocal instances based on at least one of: a closed caption, a subtitle, a script, a transcript, a scene position, a main title, an insert, a location card, a background title, a song type, a lyric of a song, a character that sings the song, an intellectual property ownership, a censorship, and a delivery format. For example, in some embodiments, metadata may be assigned to the one or more extracted recorded vocal instances to identify one or more of the foregoing listed groups to which the vocal instances belong. For example, censorship may reflect offensive content, such as nudity, bad language, substance abuse, smoking, cruelty to animals, god references, violence, sexual content, jeopardy, scary content, or the like.

The method 800 may further include, at 950, identifying, by the one or more processors, the one or more extracted record vocal instances as corresponding to a role played by a child. For example, the vocal instance of an 8-year old protagonist played by Macaulay Culkin in the movie, Home Alone may be identified as corresponding to a role played by a child.

Figure 10:
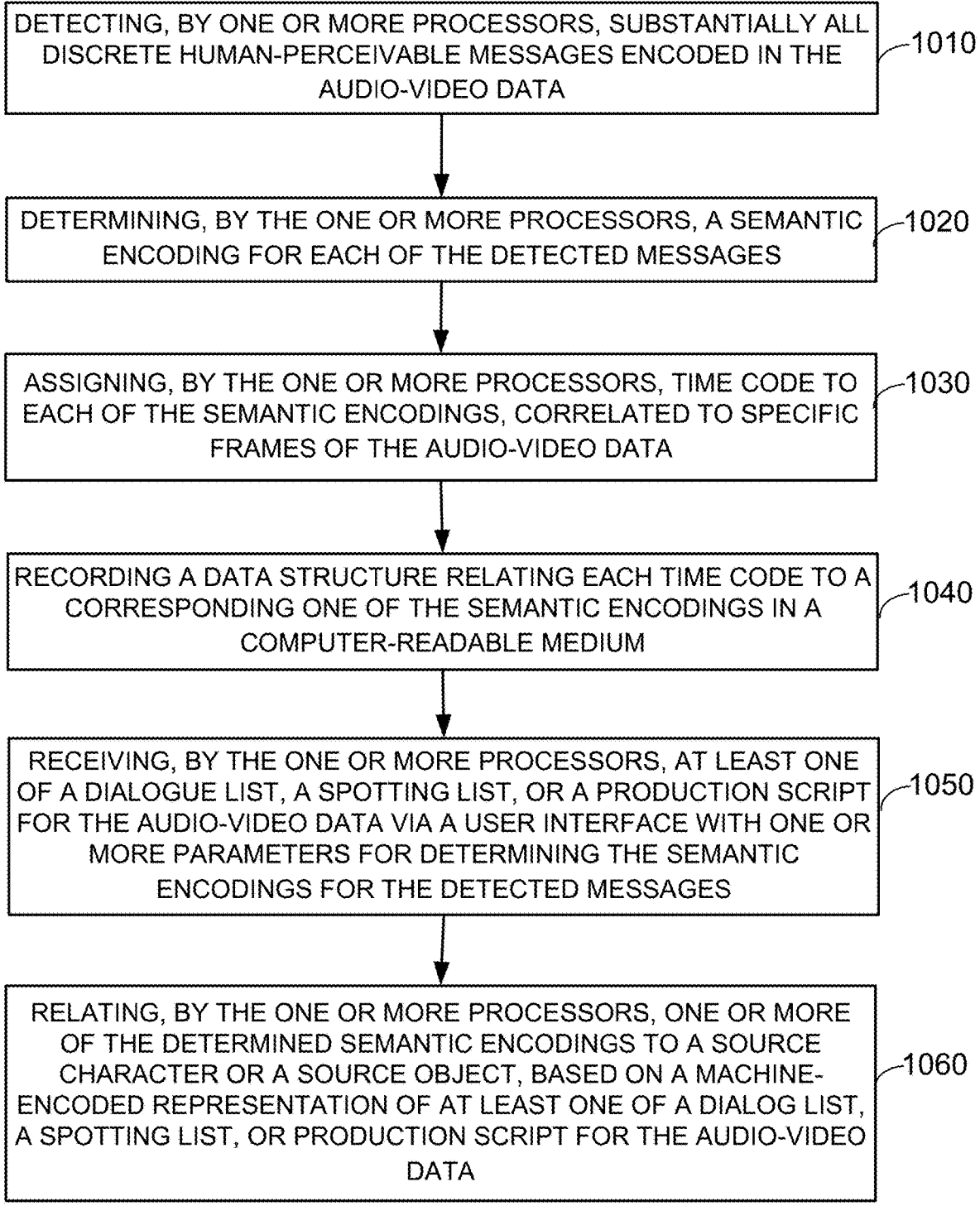
FIGS. 10-11 show aspects of another method for a content characterization process which involves transforming audio-video data, as may be performed by the processing environment or other computing apparatus described herein.

Referring to FIG. 10, an alternative embodiment of the computer-implemented method of the present disclosure is described as a method 1000, for use in generating a machine-readable metadata 360 (FIG. 3) for use in social robot control or other applications. The method 100 may omit non-essential operations shown in FIG. 10, may reorder the sequence of operations or run operations in parallel in any operable manner and may include modified or additional operations as described elsewhere herein or otherwise useful to performance of the method. The method 1000 may include, at 1010, detecting, by one or more processors, substantially all discrete human-perceivable messages encoded in the audio-video data. "Messages" include examples as previously discussed herein.

The method 1000 may further include, at 1020, determining, by the one or more processors, a semantic encoding for each of the detected messages. "Semantic encoding" includes examples as previously discussed herein.

The method 1000 may further include, at 1030, assigning, by the one or more processors, time code to each of the semantic encodings, correlated to specific frames of the audio-video data. "Time code" includes examples as previously discussed herein.

The method 1000 may further include, at 1040, recording a data structure relating each time code to a corresponding one of the semantic encodings in a computer-readable medium. For example, the data structure may include array, list (linked list), record, union, tagged union, object, graphs, binary trees, metadata, hyperlink, library, or the like.

The method 1000 may further include, at 1050, receiving, by the one or more processors, at least one of a dialogue list, a spotting list, or a production script for the audio-video data via a user interface with one or more parameters for determining the semantic encodings for the detected messages. The one or more parameters may include an emotional state of a scene or a character in a scene of an audiovisual work, or a human owner of a personalized pet robot, that is being analyzed, such as such as joy, anger, sadness, and pleasure.

The method 1000 may further include, at 1060, relating, by the one or more processors, one or more of the determined semantic encodings to a source character or a source object, based on a machine-encoded representation of at least one of a dialog list, a spotting list, or production script for the audio-video data. For example, in a scene of a dialogue between Andy and Mike that appears in the audio-video data, where Andy is scolding his son, Mike, "Hey Mike, please do your homework!!!" because Mike has not done his homework despite repeated instructions to do so, as represented by the dialog list, the one or more processors may append an "ANGRY" emotional indicator next to Andy's line in the machine encoded dialog list.

A source character may also include an on-screen or off-screen narrator, or characters that are audible by off-screen. Some of the media data analysis tools described herein rely on gesture or facial expression or other physically seen characteristics of said source character or object that happen to be speaking, but there may be no visible source character or object in some cases such as off-screen narrators. In addition, sometimes on-screen source characters or objects that do not show any relevant physical expressions, gestures or such, e.g. a character's voice occurs while we see the character sleeping or in a coma; a 'personalized robot' that does not have relevant, articulated facial or bodily means; or, an impassive 'object' like a 'speaking' cassette-tape-player to which it may be difficult or impossible to attribute meaningful viewable characteristics. Where body language and facial expressions are not available, the method may include analyzing other emotional indicators such as the characteristics of the spoken voice can. In addition, the method may include creating annotations such as, for example, "voice speaking is off-screen and coming from" the name of the character or other source (e.g., nameless narrator, machine, or undetermined source).

Figure 11:
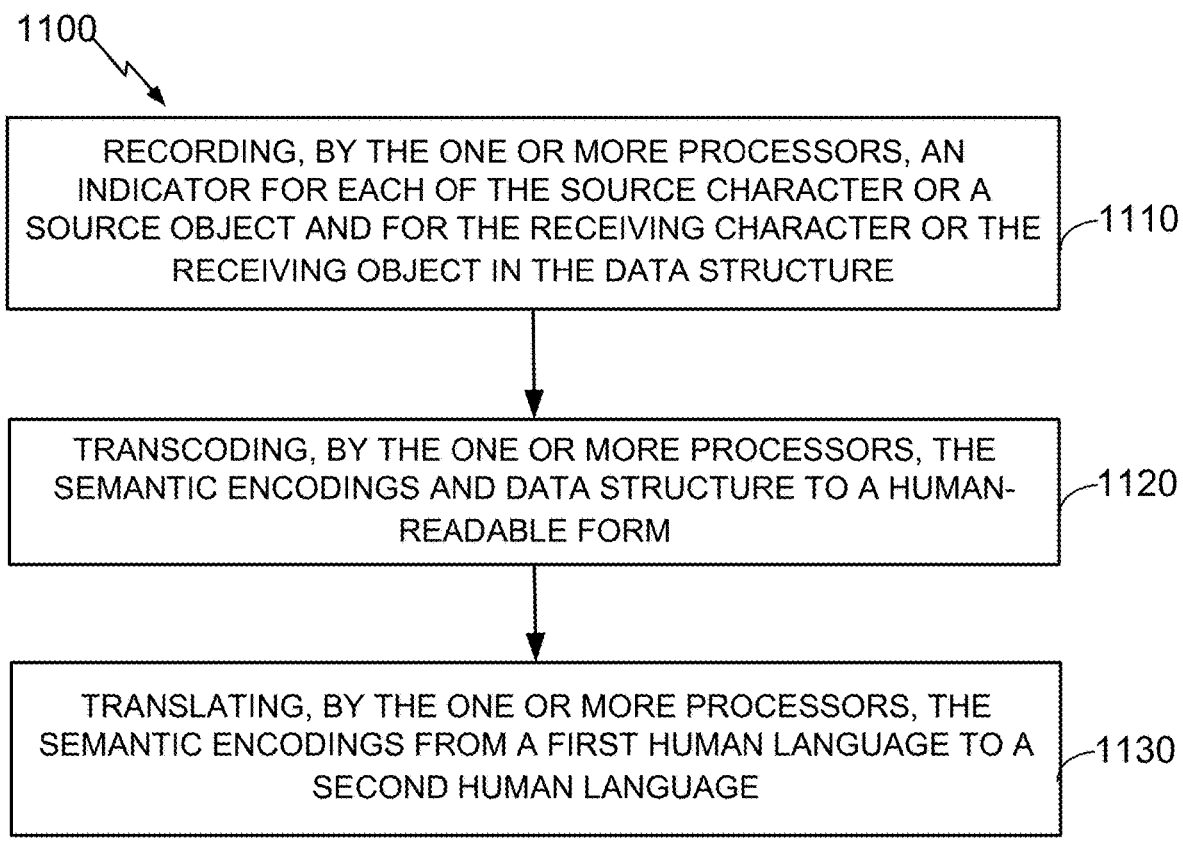

The method 1000 may include any one or more of the additional operations 1100 shown in FIG. 11, in any operative order relative to other operations of the method 1000, or in parallel to other operations if possible. The method 1000 may further include, at 1110, recording, by the one or more processors, an indicator for each of the source character or a source object and for the receiving character or the receiving object in the data structure. An indicator may be in the form of a "message," and it may include a text, an icon, or any other symbol. For example, in a dialogue between Andy and Mike, where Andy is speaking to Mike, an indicator for Andy as the source character ("SRCE CHR—ANDY"), and an indicator for Mike as the receiving character ("RECV CHR—MIKE"), may be recorded.

The method 1100 may further include, at 1120, transcoding, by the one or more processors, the semantic encodings and data structure to a human-readable form. for example, the human-readable form may include a graphical user interface.

The method 1100 may further include, at 1130, translating, by the one or more processors, the semantic encodings from a first human language to a second human language. As in the case of an example of a film released in the United States and dubbed for re-redistribution in French discussed above, the first language may be English, and the second language may be French. Of course, other combinations of the languages are possible.

Embodiment 2: Enabling Robot to Respond to Human Emotions and Act Correspondingly Any of the content characterization process which involves transforming audio-video data described herein may be executed in enabling a machine to appropriately interpret media content with the help of machine-readable semantic data 360, and use the media content appropriately when interacting with humans and act correspondingly, or other applications, for example, for enabling a personalized pet robot/media player to interact with a human ("pet" owner) and select appropriate content for use in interacting with its human companion. As mentioned, the systems and methods of the present disclosure may also be useful in characterizing content for use in meme creation, content-based games, and consumer intelligence-based content selection, and the like.

Figure 12:
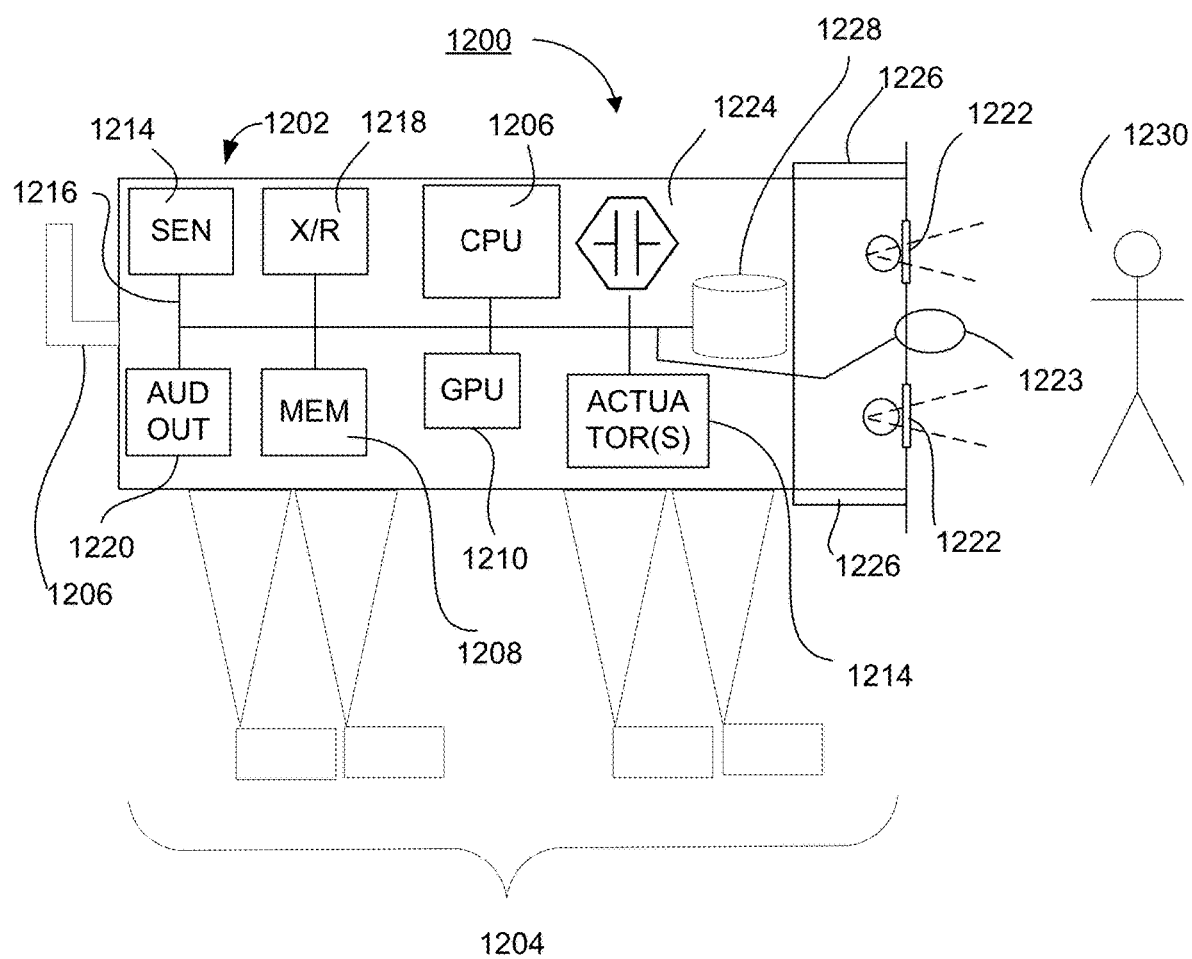
FIG. 12 a schematic diagram showing features of another apparatus for performing methods for a content characterization process which involves transforming audio-video data, responsive to sensor data indicating a user's emotional state, in an example embodiment of a personalized robot device.

FIG. 12 is a diagram illustrating one type of a personalized pet robot 1200 that may be provided in various form factors, of which robot 1200 provides but one example. The innovative methods, apparatus and systems are not necessarily limited to a particular form factor of a personalized pet robot, but may be used in a robot or machine that is capable of perceiving its surrounding environment (context) and recognizing (characterizing) inputs from human or the surrounding, and based upon the interaction, performing desirable tasks without excessive human interventions. In a real world, emotion plays a significant role in rational actions in human communication.

For example, the personalized robot 1200 in FIG. 12 mimics a four-legged small animal, such as a dog, but one that is able to "talk" or display samples of media content, e.g., video clips. In some embodiments, the robot 1200 may include a torso structure 1202 made of suitable structural material (e.g., a rigid polymer, aluminum, plastic, metal, wood, etc.), limbs 1204 and tail 1206 that may be actuated by one or more actuators 1214, a head 1226 including eyes 1222 and an image-projecting nose 1223 that is able to project video images on nearby surfaces. The robot 1200 is a simplified illustrative example; actual social robots making use of media content may be more sophisticated in design and operation. Examples of more sophisticated robots may be found in PCT Patent Application No. PCT/US2017/044038, "CONTROL OF SOCIAL ROBOT BASED ON PRIOR CHARACTER PORTRAYAL IN FICTION OR PERFORMANCE."

The robot 1200 may include a Central Processing Unit (CPU) 1206 and/or Graphics Processing Unit (GPU) 1210, a memory 1208 (e.g., similar or identical to RAM 114), a storage 1228 (e.g., similar or identical to storage device 116), a transmit/receive component or components 1218 that enabling wired or wireless communication between the CPU and an external device or server via a communication coupling such as WiFi, Bluetooth, cellular communications network, and the like. The transmit/receive component 1218 may operate using any suitable high-bandwidth wireless technology or protocol, including, for example, cellular telephone technologies such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component or components 1218 may enable uploading and downloading of media data (audio data, video data, etc.) to and from a local or remote server or device, and uplink transmission of sensor and other data to the local or remote server or device for transformation of semantic encoding as described herein.

The robot 1200 may include one or more sensors 1214 (e.g., a motion sensor, an accelerometer, a position sensor, a biometric sensor, a temperature sensor, a location sensor (for example, a Global Positioning System (GPS) receiver and controller), an eye-tracking sensor). that may detect a motion or other state of a user 1230, for example, motion of a real world or virtual-reality character, or the bodily state of the user, for example, skin temperature or pulse, an audio sensor (e.g., microphone) 1224, and a speaker 1220.

All the foregoing electrical components (1208-1228) of the robot 1200 are communicably connected to the CPU 1206 via the communications bus 1216.

The one or more sensors 1214 may further include, for example, a Global.

Positioning System (GPS) sensor indicating a geographic position of the robot 1200. The one or more sensors 1214 may further include, for example, a camera or image sensor positioned to detect an orientation of one or more of the user's body parts such as the eyes, facial features, gestures, and postures. In some embodiments, a camera, image sensor, or other sensor configured to detect the user's eyes or eye movements may be mounted in the support structure 1226 and coupled to the CPU 1206 via the bus 1216 and a serial bus port (not shown), for example, a Universal Serial Bus (USB) or other suitable communications port. The one or more sensors 1214 may further include, for example, an interferometer positioned in the support structure 1226 and configured to indicate a surface contour to the user's face of other body parts. The one or more sensors 1214 may further include or communicate with, for example, an audio sensor 1224 such as a microphone, array or microphones, or other audio input transducer for detecting spoken user commands or verbal and non-verbal audible reactions to display output. The one or more sensors 1214 may include, for example, a camera to sense external objects such as the owner 1230, a temperature sensor configured for sensing skin or body temperature of the user 1230 when holding the robotic dog 1200, or other sensors for collecting environmental or biofeedback data.

The CPU 1206 and/or GPU 1210 may execute certain functional modules or applications for performing methods for transforming audio-video data, according to one or more embodiments of the instant disclosure. The functional modules that may comprise an apparatus or application executed by the CPU 1206 or GPU 1210 of the robot 1200, may make use of the machine-readable data 360 as metadata to interpret a set of video clips in its library. For example, the robot may have in internal storage or available through a network connection a library of dog or animal clips, showing dogs acting alone or interacting with other people or animals. Each of the clip may have its semantic and emotional content characterized in an accompanying metadata package. Thus, the robot 1200 can select an appropriate video clip to project or otherwise play in response to its sensors indicating an environmental state of its human owner/companion 1230 or other contextual factors.

The transformation engine 200 that may be implemented by the robot 1200 may receive media data 310 via one or more sensors 1214 and/or sensor 1224.

As an example, in some embodiments, a person 1230, who is an owner of the personalized pet robot 1200, may register herself as the owner/user of the robot 1200, by having the robot 1200 conduct facial recognition and voice recognition on her, among other steps. Thus, when the registered owner 1230 returns home from work and calls to the robot 1200, "Joey, I am home!" where Joey is the name given to the robot 1200, the robot 1200 will recognize the face and voice of the owner 1230 and greets with a positive response, such playing an audio through speaker 1220 that simulates barking in a happy, welcoming tone, and jumping up and down using limbs 1204, and wagging the tail 1206 that simulates happy emotion of a dog, and/or selecting and playing a media clip that indicates a similar response. Advantageously, the robot can use a selection process based on the semantic metadata that is fast and appropriate without being dull and predictable.

For further example, if the owner 1230 returns home and calls to the robot 1200, "Joey, I am home . . . " in a sad tone and/or shows a sad face, the robot 1200 will acknowledge the sad emotional content in the detected audio and/or video inputs detected by the transformation engine 200, and provide a response different from the happy welcome-home example above. Instead, the robot 1200 may respond with a concerned yelping noise to convey concern for the owner 1230 and select a video clip to play that conveys a sympathetic, concerned tone. In view of these examples, it should be plain that the robotic pet 1200 need not require elaborate mechanical moving parts to select and play appropriate media for the circumstances. Media selection and play using machine-readable metadata 360 may be performed by less mechanically elaborate devices, for example, smartphones, notepad computers, or other computers with the capacity to run the algorithms as described herein and play media clips.

Thus, depending on the semantic encoding detected in the media data (e.g., speech, facial expression, gesture, posture, and contextual data (stranger vs. registered owner, etc.), the robot 1200 may produce or execute a response, including giving feedback to the human user 1230 or any other controlling person or device, to indicate the detected information. The response is achieved, for instance, by delivering a visual, aural, electrical or mechanical signal indicative of the detected semantic encoding (e.g., emotion), including selecting and playing a video clip using the semantic metadata 360.

Components of Apparatus or System

Figure 13:
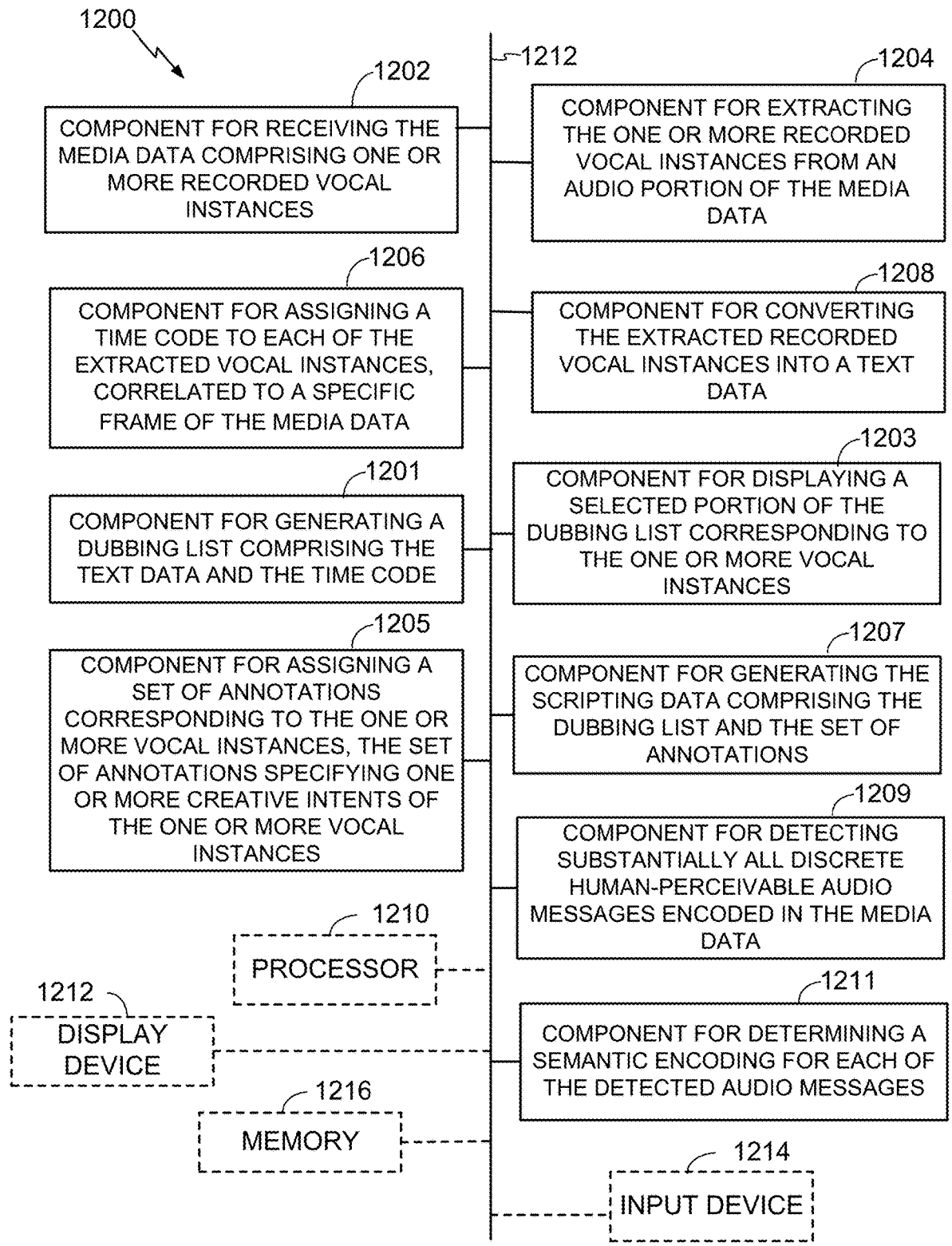
FIG. 13 is a conceptual block diagram illustrating components of an apparatus or system for a content characterization process which involves transforming audio-video data.

FIG. 13 is a conceptual block diagram illustrating components of an apparatus or system 1200 for content characterization process which involves transforming audio-video data as described herein. The apparatus or system 1200 may include additional or more detailed components as described herein. For example, the processor 1210 and memory 1216 may contain an instantiation of an analysis application (e.g., 550) as described herein above, including the more detailed components pointed out in FIG. 12 and other ancillary components. As depicted, the apparatus or system 1200 may include functional blocks that can represent functions implemented by a processor, software, or combination thereof (e.g., firmware).

As illustrated in FIG. 13, the apparatus or system 1200 may comprise an electrical component 1202 for receiving the media data comprising one or more recorded vocal instances. The component 1202 may be, or may include, a means for providing this function. Said means may include the processor 1210 coupled to the memory 1216, and to the input device 1214, the processor executing an algorithm based on program instructions stored in the memory. Such algorithm may include a sequence of more detailed operations, as described or illustrated herein.

The apparatus 1200 may further include an electrical component 1204 for extracting the one or more recorded vocal instances from an audio portion of the media data. The component 1204 may be, or may include, the means for extracting the one or more recorded vocal instances from an audio portion of the media data. Said means may include the processor 1210 coupled to the memory 1216, and to the input device 1214, the processor executing an algorithm based on program instructions stored in the memory. Such algorithm may include a sequence of more detailed operations, for example, and one or more of the more detailed operations described in connection with FIG. 2, or otherwise described or illustrated herein.

The apparatus 1200 may further include an electrical component 1206 for assigning a time code to each of the extracted vocal instances, correlated to a specific frame of the media data. The component 1206 may be, or may include, the means for assigning a time code to each of the extracted vocal instances, correlated to a specific frame of the media data. Said means may include the processor 1210 coupled to the memory 1216, and to the input device 1214, the processor executing an algorithm based on program instructions stored in the memory. Such algorithm may include a sequence of more detailed operations as described or illustrated herein.

The apparatus 1200 may further include an electrical component 1208 for converting the extracted recorded vocal instances into a text data. The component 1208 may be, or may include, the means for converting the extracted recorded vocal instances into a text data. Said means may include the processor 1210 coupled to the memory 1216, and to the input device 1214, the processor executing an algorithm based on program instructions stored in the memory. Such algorithm may include a sequence of more detailed operations, for example, speech-to-text conversion, as described or illustrated herein.

The apparatus 1200 may further include an electrical component 1201 for generating a dubbing list comprising the text data and the time code. The component 1201 may be, or may include, the means for generating a dubbing list comprising the text data and the time code. Said means may include the processor 1210 coupled to the memory 1216, and to the input device 1214, the processor executing an algorithm based on program instructions stored in the memory. Such algorithm may include a sequence of more detailed operations, as described or illustrated herein.

The apparatus 1200 may further include an electrical component 1203 for displaying a selected portion of the dubbing list corresponding to the one or more vocal instances. The component 1201 may be, or may include, the means for displaying a selected portion of the dubbing list corresponding to the one or more vocal instances. Said means may include the processor 1210 coupled to the memory 1216, and to the input device 1214, the processor executing an algorithm based on program instructions stored in the memory. Such algorithm may include a sequence of more detailed operations, for example, splitting a screen, displaying a plurality of tabs, or displaying multiple screens or tabs side-by-side or simultaneously on a display, as described or illustrated herein.

The apparatus 1200 may further include an electrical component 1205 for assigning a set of annotations corresponding to the one or more vocal instances, the set of annotations specifying one or more creative intents of the one or more vocal instances. The component 1205 may be, or may include, the means for assigning a set of annotations corresponding to the one or more vocal instances, the set of annotations specifying one or more creative intents of the one or more vocal instances. Said means may include the processor 1210 coupled to the memory 1216, and to the input device 1214, the processor executing an algorithm based on program instructions stored in the memory. Such algorithm may include a sequence of more detailed operations, for example, and one or more of the more detailed operations described in connection with FIG. 5, or otherwise described or illustrated herein.

The apparatus 1200 may further include an electrical component 1207 for generating the scripting data comprising the dubbing list and the set of annotations. The component 1207 may be, or may include, the means for generating the scripting data comprising the dubbing list and the set of annotations. Said means may include the processor 1210 coupled to the memory 1216, and to the input device 1214, the processor executing an algorithm based on program instructions stored in the memory. Such algorithm may include a sequence of more detailed operations as described or illustrated herein.

The apparatus 1200 may further include an electrical component 1209 for detecting substantially all discrete human-perceivable audio messages encoded in the media data. The component 1209 may be, or may include, the means for detecting substantially all discrete human-perceivable audio messages encoded in the media data. Said means may include the processor 1210 coupled to the memory 1216, and to the input device 1214, the processor executing an algorithm based on program instructions stored in the memory. Such algorithm may include a sequence of more detailed operations as described or illustrated herein.

The apparatus 1200 may further include an electrical component 1211 for determining a semantic encoding for each of the detected audio messages. The component 1211 may be, or may include, the means for determining a semantic encoding for each of the detected audio messages. Said means may include the processor 1210 coupled to the memory 1216, and to the input device 1214, the processor executing an algorithm based on program instructions stored in the memory. Such algorithm may include a sequence of more detailed operations, for example, generating the set of annotations based on one or more of the determined semantic encodings, as described in connection with FIGS. 5-6, or as described or illustrated herein.

The apparatus 1200 may optionally include a processor module 1210 having at least one processor, in the case of the apparatus 1200 configured as a data processor. The processor 1210, in such case, may be in operative communication with the modules 1202-1204 via a bus 1212 or similar communication coupling. The processor 1210 may effect initiation and scheduling of the processes or functions performed by electrical components 1202-1204.

In related aspects, the apparatus 1200 may include a network interface module (not shown) operable for communicating with, e.g., an analysis server over a communication network, enabling augmentation or supplementation of the functionalities of the present method for transforming audio-video data as described herein. Or, the network interface module may be operable for communicating with a data server, enabling collaborative dubbing process as described herein. In further related aspects, the apparatus 1200 may optionally include a module for storing information, such as, for example, a memory device/module 1216. The computer readable medium or the memory module 1216 may be operatively coupled to the other components of the apparatus 1200 via the bus 1212 or the like. The memory module 1216 may be adapted to store computer readable instructions and data for effecting the processes and behavior of the modules 1202-1204, and subcomponents thereof, or the processor 1210, or the method 1100 and one or more of the additional operations 900, 1000 or 1100 disclosed herein. The memory module 1216 may retain instructions for executing functions associated with the modules 1202-1204. While shown as being external to the memory 1216, it is to be understood that the modules 1202-1204 can exist within the memory 1216.

The apparatus 1200 may include a display device 1215, which may include one or more display outputs (e.g., LCD display screens or DLP projectors) coupled to the processor 1210 via a bus 1212 and a graphics processing unit (not shown). Other outputs may include, for example, an audio output transducer (not shown). The input device 1214 may comprise any suitable device for obtaining player input, examples of which are provided herein above.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.]

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), and the like), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or medium.

Having thus described a preferred embodiment of a system and method for mezzanine compression using region-of-interest encoding sensitive to luma and chroma limits, it should be apparent to those skilled in the art that certain advantages of the within system have been achieved.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure.

What is claimed is:

1. A computer-implemented method for creating a scripting data for dubbed audio of a media data, the method comprising:
receiving, by one or more processors, the media data comprising one or more recorded vocal instances;
extracting, by the one or more processors, the one or more recorded vocal instances from an audio portion of the media data;
determining, by the one or more processors, a semantic encoding for a human-perceivable message encoded in the media data based on an analysis of a scene or a character represented in the one or more recorded vocal instances;
assigning, by the one or more processors, a time code to each of the extracted vocal instances and to the determined semantic encoding, correlated to a specific frame of the media data;
converting, by the one or more processors, the extracted recorded vocal instances into a text data;
generating, by the one or more processors, a dubbing list comprising the text data and the time code;
displaying, by the one or more processors, a selected portion of the dubbing list corresponding to the one or more vocal instances;
assigning, by the one or more processors, a set of annotations corresponding to the one or more vocal instances based on the determined semantic encoding; and
generating, by the one or more processors, the scripting data comprising the dubbing list and the set of annotations.

2. The method of claim 1, wherein the time code includes a time-in and a time-out.

3. The method of claim 1, wherein the dubbing list further includes an identity information of each of the extracted vocal instances.

4. The method of claim 1, wherein the dubbing list is selected from a group consisting of a dialogue list, a spotting list, or both.

5. The method of claim 1, further comprising generating, by the one or more processors, the set of annotations including at least one of: an explanation of context specific to a language used in the one or more extracted vocal instances, a description of a scene in which the one or more extracted vocal instances occur, or annotations for a rotoscoped content.

6. The method of claim 1, further comprising translating, by the one or more processors, the text data in a first language to a second language.

7. The method of claim 1, further comprising grouping, by the one or more processors, the one or more extracted recorded voice instances based on at least one of: a closed caption, a subtitle, a script, a transcript, a scene position, a main title, an insert, a location card, a background title, a song type, a lyric of a song, a character that sings the song, an intellectual property ownership, a censorship, and a delivery format.

8. The method of claim 1, further comprising identifying, by the one or more processors, the one or more extracted record voice instances as corresponding to a role played by a child.

9. An apparatus for creating a scripting data for dubbed audio of a media data, the apparatus comprising:
at least one memory storing processor-readable instructions;
one or more processors configured to access the at least one memory and execute the processor-readable instructions to perform operations, the operations comprising:
receiving the media data comprising one or more recorded vocal instances;
determining a semantic encoding for a human-perceivable message encoded in the media data based on an analysis of a scene or a character associated with the one or more recorded vocal instances;
extracting the one or more recorded vocal instances from an audio portion of the media data;
assigning a time code to each of the extracted vocal instances and to the determined semantic encoding, correlated to a specific frame of the media data;
converting the extracted recorded vocal instances into a text data;
generating a dubbing list comprising the text data and the time code;
displaying a selected portion of the dubbing list corresponding to the one or more vocal instances;
assigning a set of annotations corresponding to the one or more vocal instances based on the determined semantic encoding; and
generating the scripting data comprising the dubbing list and the set of annotations.

10. The method of claim 1, further comprising:
correlating, by the one or more processors, the determined semantic encoding to one or more emotional indicators based on a machine learning algorithm.

11. The method of claim 1, wherein the analysis of the scene or the character includes one or more of a facial expression analysis, an action/gesture/posture analysis, a mood analysis, or a perspective analysis.

12. The apparatus of claim 9, wherein the operations further comprise:
correlating the determined semantic encoding to one or more emotional indicators based on a machine learning algorithm.

13. The apparatus of claim 9, wherein the analysis of the scene or the character includes one or more of a facial expression analysis, an action/gesture/posture analysis, a mood analysis, or a perspective analysis.

14. A non-transitory computer-readable medium containing instructions for creating a scripting data for dubbed audio of a media data, the instructions comprising:
receiving the media data comprising one or more recorded vocal instances;
extracting the one or more recorded vocal instances from an audio portion of the media data;
determining a semantic encoding for a human-perceivable message encoded in the media data based on an analysis of a scene or a character represented in the one or more recorded vocal instances;
assigning a time code to each of the extracted vocal instances and to the determined semantic encoding, correlated to a specific frame of the media data;
converting the extracted recorded vocal instances into a text data;
generating a dubbing list comprising the text data and the time code;
displaying a selected portion of the dubbing list corresponding to the one or more vocal instances;
assigning a set of annotations corresponding to the one or more vocal instances based on the determined semantic encoding; and
generating the scripting data comprising the dubbing list and the set of annotations.

15. The non-transitory computer-readable medium of claim 14, wherein the time code includes a time-in and a time-out.

16. The non-transitory computer-readable medium of claim 14, wherein the dubbing list further includes an identity information of each of the extracted vocal instances.

17. The non-transitory computer-readable medium of claim 14, wherein the dubbing list is selected from a group consisting of a dialogue list, a spotting list, or both.

18. The non-transitory computer-readable medium of claim 14, further comprising:
correlating the determined semantic encoding to one or more emotional indicators based on a machine learning algorithm.

19. The non-transitory computer-readable medium of claim 14, wherein the analysis of the scene or the character includes one or more of a facial expression analysis, an action/gesture/posture analysis, a mood analysis, or a perspective analysis.

20. The non-transitory computer-readable medium of claim 14, further comprising identifying the one or more extracted record voice instances as corresponding to a role played by a child.

* * * * *